US011797800B2

(12) United States Patent
Wolfenson et al.

(10) Patent No.: US 11,797,800 B2
(45) Date of Patent: Oct. 24, 2023

(54) DIRECTED CONNECTIONS ON A COMMUNICATION PLATFORM

(71) Applicant: vTail Healthcare Telecommunications Limited, Royston (GB)

(72) Inventors: Barry Wolfenson, Philadelphia, PA (US); Philip Andrews, Newbury (GB); Mark Gibaud, Beckenham (GB); Adam Harwood, Hampshire (GB)

(73) Assignee: vTail Healthcare Telecommunications Limited, Royston (GB)

( * ) Notice: Subject to any disclaimer, the term of this patent is extended or adjusted under 35 U.S.C. 154(b) by 73 days.

(21) Appl. No.: 17/688,766

(22) Filed: Mar. 7, 2022

(65) Prior Publication Data
US 2022/0286414 A1      Sep. 8, 2022

Related U.S. Application Data

(60) Provisional application No. 63/157,802, filed on Mar. 7, 2021.

(51) Int. Cl.
| | | |
|---|---|---|
| *H04L 51/02* | (2022.01) | |
| *H04L 51/046* | (2022.01) | |
| *H04L 51/063* | (2022.01) | |
| *H04L 67/306* | (2022.01) | |
| *G06K 7/14* | (2006.01) | |
| *H04L 65/1069* | (2022.01) | |
| *H04L 5/02* | (2006.01) | |

(52) U.S. Cl.
CPC ......... *G06K 7/1417* (2013.01); *G06K 7/1443* (2013.01); *H04L 5/02* (2013.01); *H04L 51/046* (2013.01); *H04L 51/063* (2013.01); *H04L 65/1069* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 8,903,910 B2* | 12/2014 | Kallayil | ................ | H04L 67/306 |
| | | | | 709/204 |
| 8,984,051 B2* | 3/2015 | Olsen | .................... | G06F 3/0482 |
| | | | | 370/352 |
| 9,591,090 B2* | 3/2017 | Bedi | ..................... | H04L 67/306 |
| 10,728,360 B2* | 7/2020 | Zeng | .................... | H04L 67/306 |
| 11,288,591 B2* | 3/2022 | Saha | ..................... | G16H 80/00 |
| 11,364,386 B2* | 6/2022 | Ibarrola | ............. | A61N 1/37235 |
| 2004/0098449 A1* | 5/2004 | Bar-Lavi | ............... | H04L 67/306 |
| | | | | 709/202 |
| 2005/0138049 A1* | 6/2005 | Linden | ................ | G06F 16/9536 |

(Continued)

*Primary Examiner* — Backhean Tiv
(74) *Attorney, Agent, or Firm* — Thomas E. Lees, LLC

(57) ABSTRACT

A dynamic communication link provided. Briefly, a process aggregates content from content providers in the form of triggers (e.g., QR codes, newsfeeds, etc.). Here, the content is related to information of interest to users. In the example of newsfeeds, the process curates a newsfeed for a user by assembling articles, each article selected for the user based upon data in a user profile, data associated with the article, combinations thereof, etc. Upon initiation of the trigger, the communication platform initiates an ability to carry out a direct communication between the user and a specific representative of a content provider that is associated with the trigger, where the direct communication is independent of the trigger.

20 Claims, 15 Drawing Sheets

(56) References Cited

U.S. PATENT DOCUMENTS

| | | | | |
|---|---|---|---|---|
| 2014/0129312 A1* | 5/2014 | Grishaver | .......... | G06Q 30/0222 |
| | | | | 705/14.23 |
| 2018/0196815 A1* | 7/2018 | Vadrevu | .............. | G06F 16/2455 |
| 2018/0253193 A1* | 9/2018 | Zeng | ...................... | G06Q 10/10 |
| 2022/0284209 A1* | 9/2022 | Wolfenson | .......... | H04L 65/1069 |
| 2022/0286414 A1* | 9/2022 | Wolfenson | ......... | G06Q 30/0241 |

* cited by examiner

DIRECTED CONNECTIONS ON A COMMUNICATION PLATFORM

CROSS REFERENCE TO RELATED APPLICATIONS

This application claims the benefit of U.S. Provisional Patent Application Ser. No. 63/157,802, filed Mar. 7, 2021, having the title COMMUNICATION PLATFORM, the disclosure of which is hereby incorporated herein by reference.

BACKGROUND

Various aspects of the present invention relate generally to communication platforms, and more particularly, to a communication platform that leverages user-based roles to facilitate information gathering and to control communication between users of the communication platform.

An online service is an internet-based platform that allows users to connect with one another, and to publish or distribute content among the users of the online service. In this regard, such platforms can provide a convenient mechanism by which to communicate. For instance, an online service may include a search engine, subscriber profiles, newsfeeds and means by which individuals can post, comment, respond, react, or otherwise provide feedback to posted content. However, such platforms are typically intended for information consumption and/or information distribution at the leisure of the user. Moreover, such online services are typically centered around social purposes of information distribution for enjoyment.

BRIEF SUMMARY

According to aspects of the present disclosure, approaches are provided that facilitate interaction between a user and platform content. The interaction may lead to, or otherwise trigger, a connection between a user and a matched contact across a communication platform. Here, the contact may be for example, a matched connection associated with an entity, such as a representative of a company.

In an example embodiment, a user operates a processing device (e.g., smartphone, tablet, laptop, desktop computer, etc.) having a graphical user interface. An app, software program, webpage, or other code causes the processing device to display on a display screen, relevant content, including a user interface element such as a "Contact" icon. Here, the user interface element (e.g., represented as a button) is a trigger. The connection between the user and the matched contact is facilitated responsive to the user selecting the user interface element (e.g., selecting, pressing, clicking on, or otherwise navigating to and selecting a "contact" icon visually depicted as a "contact" button).

By way of example, a digital "contact" icon can reside within the content, or may be otherwise displayed somewhere within a display area generated by the graphical user interface. Thus, the "contact icon" can be presented in a story, article, as part of a newsfeed, as product information, a news article, promotional banner, educational content, as a company list, or other electronic content provided in the app, within a control section, within a template, within a workspace or wrapper, as part of a designated screen, etc. Regardless, the contact icon (e.g., a "Contact" button) functions as a trigger to enable the direct connection between the user and the matched contact.

In another example embodiment, a contact icon can be implemented as a detectable code (e.g., a barcode or QR (Quick Response) code). The detectable code can be provided on an article, e.g., product, product package, label, sell sheet, flyer, or other physical media, an advertisement, or other printed or on-line materials. Here, the user's processing device can utilize a camera to scan the code, which launches the app and triggers the app to enable access to content on the communication platform. The associated content can include a "contact" icon or other suitable trigger as described more fully herein, thus facilitating direct communication between the user and the matched contact. Thus, the QR code in this example, is external to the app. Here, the matched contact can be a contact associated with the scanned code. In another embodiment, the app can include a code scanner function. Thus, the user can open the app, select the scanner and use a camera or other device to scan a QR code on a physical media. Analogous to that above, scanning the QR code triggers the app to enable access to content, including the ability to launch a direct communication between the user and the matched contact, who may be associated with the QR code.

Regardless, whether by scanning a QR code (inside or outside the app) or by the user accessing content from within the app, the user can gain access to a "contact" feature, as noted more fully herein. In certain embodiments, actuation of the "contact" feature triggers the user to be directed to their matched contact(s) within an associated entity (matched connection(s) within a company). The matched contact can be selected for instance, based upon the trigger (e.g., selecting the matched contact based upon the QR code, company associated with the QR code, "connect" button, content the connect button is associated with, company that provided the content associated with the connect button, etc.). Moreover, in some embodiments, the user can then initiate a text, phone or video call with any of the matched contacts.

Regardless of the trigger, in some embodiments, the direct communication can include a telephone call, a video call, a text message, or combination thereof, where the communication is handled through the communication platform so that personal contact information of the user (e.g., the user's phone number, email address, etc.) is not revealed in the direct communication to the matched contact.

According to aspects of the present disclosure, a process for creating a dynamic link on a communication platform is provided. The process comprises storing in a data source associated with the communication platform, a user profile of a user registered to utilize the communication platform. The process also comprises curating a newsfeed for the user from a collection of aggregated articles, where each article is selected for the user based upon at least one of data in the user profile and data associated with the article. The process further comprises communicating the curated newsfeed to a display of a processing device for viewing by the user and opening a user-selected article of the curated newsfeed for viewing on the display of the processing device. Yet further, the process comprises displaying a user-selectable contact icon on the display of the processing device at least while the user-selected article is opened. In this regard, upon selection of the contact icon by the user, the communication platform facilitates a direct communication with a specific contact of a content provider associated with the user-selected article, where the specific contact is associated with the user by a relationship on the communication platform, and wherein the direct communication is independent of the newsfeed.

In the context of a clinical environment, an example process for creating a dynamic communication link on a communication platform is provided. The process comprises storing in a database associated with a communication platform, a clinician profile of a clinician registered to utilize the communication platform. The process also comprises aggregating articles from content providers on the communication platform, the articles relating to information of interest to clinicians, each article having an article profile that defines an intended audience of users on the communication platform. The process further comprises curating a newsfeed for the clinician by assembling select ones of the aggregated articles, each article selected for the clinician based upon matching data in the clinician profile and data in the article profile, the curated newsfeed articles limited to content providers for which the clinician has a relationship or for which the clinician can form a relationship based upon rules defined by the communication platform. Yet further, the process comprises sending the curated newsfeed to a display of a processing device for viewing by the clinician, opening a clinician-selected article of the curated newsfeed for viewing on the display of the processing device, and providing a user-selectable contact icon on the display of the processing device at least while the clinician-selected article is displayed. Upon selection of the contact icon by the clinician, the communication platform facilitates a direct communication with a specific contact of the content provider that is uniquely associated with the clinician by a relationship on the communication platform, where the direct communication is independent of the newsfeed.

According to further aspects of the present disclosure, a process for creating a dynamic communication link on a communication platform is provided. The process comprises detecting that a user interacting with a processing device has acted upon a trigger associated with content and forming a direct connection between the user and the matched contact across the communication platform, where the matched contact is associated with the trigger. For instance, responsive to detecting that the user acted upon the trigger, the process can comprise loading onto a user interface of the processing device of the user, a screen that facilitates direct communication with a contact that is associated with an entity on the communication platform that is associated with the trigger.

Detecting that a user has acted upon a trigger can comprise reading a scannable code, activating a camera on a processing device to scan a QR code, loading an image on the processing device and extracting a QR code from the image, etc. As a few examples, the code can be detected on a select one of a product package, an electronic information document, a newsfeed article, or other electronic media content.

In some example embodiments, the communication platform initiates a direct communication with a specific contact associated with the content provider by launching a graphical representation of a directory onto the processing device, the directory individuals associated with the entity.

Once a contact is selected, the communication platform initiates direct communication with the selected contact of the entity by enabling a telephone call, video call, text message, or other communication through the platform.

According to still further aspects herein, a process for creating a dynamic communication link on a communication platform, comprises aggregating triggers from content providers on the communication platform, the triggers relating to information of interest to users, each trigger having profile that defines available data to be presentable on the communication platform. The process also comprises initiating a trigger by a user on the communication platform. The process still further comprises displaying a user-selectable contact on a display of the processing device, wherein, upon selection of the contact by the user, the communication platform initiates a direct communication with a specific contact of the content provider that is associated with the user by a relationship on the communication platform, where the direct communication is independent of the trigger.

DETAILED DESCRIPTION

System Overview

Figure 1:
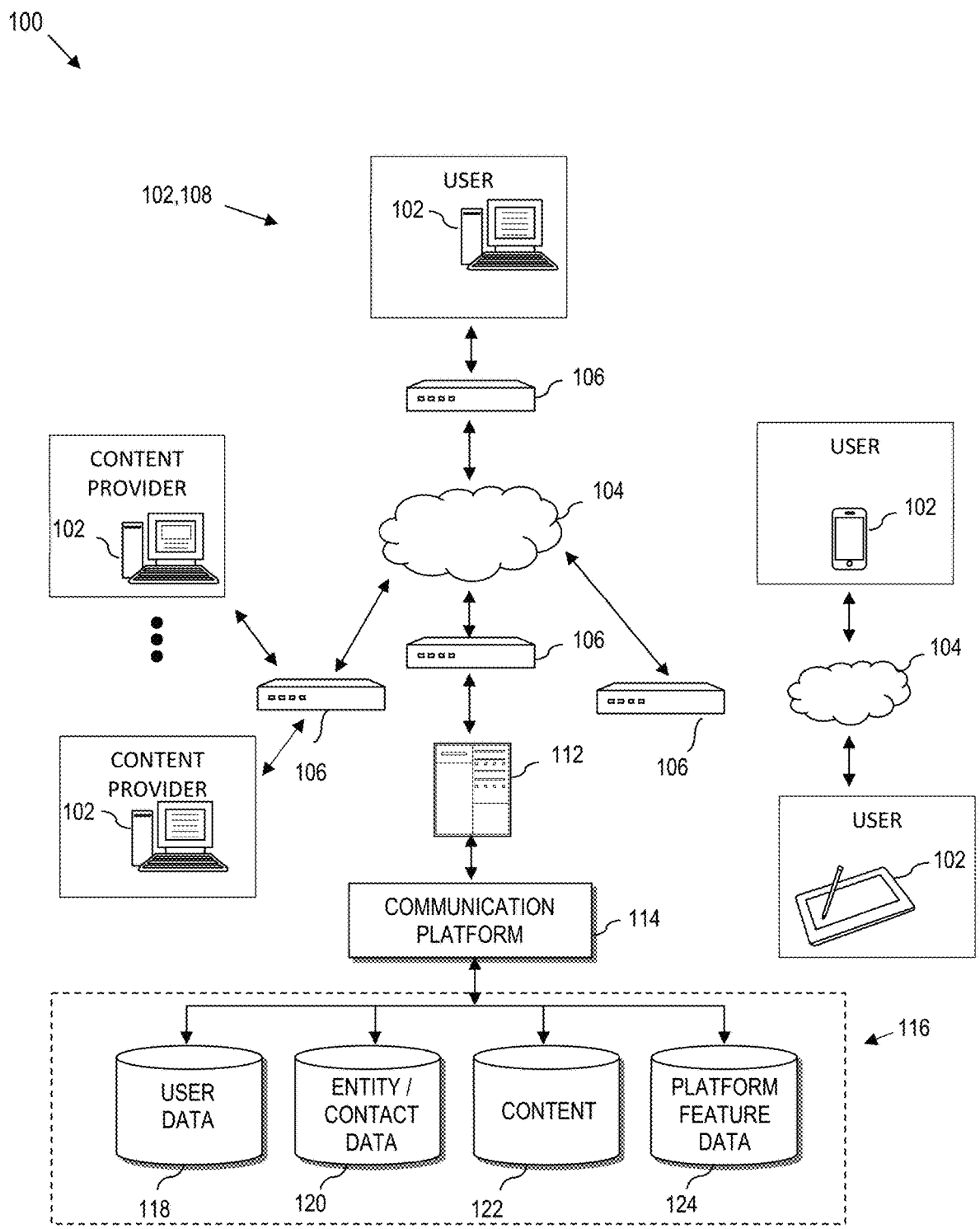
FIG. 1 is a block diagram of a computer system illustrating users and content providers connected to a communication platform, according to aspects of the present disclosure.

Referring now to the drawings, and in particular, to FIG. 1, a computer system 100 is provided for implementing an electronic communication platform according to various aspects of the present disclosure.

The computer system 100 comprises a plurality of hardware and/or software processing devices (designated generally by 102) that are linked together by one or more network(s) (designated generally by 104).

In certain contexts and roles, a processing device 102 is intended to be mobile, e.g., a personal data assistant (PDA), smart telephone, tablet computer, laptop computer, etc. A processing device 102 can also comprise a personal desktop computer, server, or other processing device.

Each network 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more intranets, extranets, local area networks (LAN), wide area networks (WAN), wireless networks (Wi-Fi), the Internet, including the world wide web, cellular, cellular to internet bridges, and/or other arrangements for enabling communication between the processing devices 102, in either real time or otherwise (e.g., via time shifting, batch processing, etc.).

The illustrative computer system 100 also includes a server 112 (e.g., a web server, file server, and/or other processing device) that supports a communication platform 114 and corresponding data sources (collectively identified as data sources 116). The communication platform 114 and data sources 116 provide the resources to implement the various server-side features and functionality as described in greater detail herein.

Solely by way of schematic illustration, the data sources 116 are implemented by a collection of databases that store various types of information related to the communication platform 114. In the illustrative example, the data sources 116 include a user data source 118, which can store information about users, including various profile data, attributes, settings, preferences, communication information, etc., as will be described in greater detail herein. The data sources 116 also include an entity/entity contact data source 120, which can be utilized to store information about entities, e.g., companies, content providers, service providers, organizations, etc. Entities can represent a class of user that includes contacts such as employees, representatives, agents, or other classifications of users that associate with the entity, and who participate on the communication platform for communication with other users.

Yet further, the data sources 116 include a content data source 122. The content data source 122 can in practice, be implemented as one or more data sources, which can collectively store, link to, or otherwise provide access to platform relevant content. For instance, the content data source 122 can include newsfeed information (e.g., via a newsfeed database), postings (e.g., via a postings database), advertisements (e.g., via an advertisements database), promotional distributions (e.g., via a promotions database), announcements (e.g., via an announcements database), media (e.g., via a media database), news (e.g., via a news database), company information (e.g., via a company information database), product information (e.g., via a product information database), other forms of content intended to be shared with users on the communication platform 114, or any combination thereof. In an example implementation, users can function as content providers (e.g., a company announcing a new product) to generate newsfeeds, articles of interest, etc. Also, users can be selective consumers of content. Other examples are provided herein.

Yet further, the data sources 116 can include a platform feature data source 124, e.g., data resources utilized by the communication platform 114 to carry out offered functionality not otherwise specifically addressed herein.

The above list is not exhaustive and is intended to be illustrative only. Other data may also and/or alternatively be present. Moreover, data can come from sources that are not directly and/or locally connected to the communication platform 114. For instance, in certain exemplary implementations, data may be obtained from remote servers. Yet further, the data source grouping in this example is conceptual and not intended to be limiting to the manner in which data is collected, manipulated and stored.

In use, the communication platform 114 provides content and communication resources that allows users to consume content (designated USER in FIG. 1), and to provide content (designated CONTENT PROVIDER in FIG. 1) by connecting to the communication platform 114 via a suitable processing device 102. As will be described more fully herein, the communication platform 114 provides several ways that users can communicate, such as by managing user-customized networks of relationships, by facilitating in-platform communication, by facilitating out-of-platform communication, by providing newsfeeds, alerts, and other features that assist users in receiving information, distributing information, and acting on information. In this regard, examples of features and capabilities are described in greater detail below.

User Interface

The communication platform 114 provides cloud (server-side) support to remote processing devices 102. In this regard, each processing device 102 runs an "app", software program, web browser that loads a uniform resource locator (URL) associated with the communication platform 114, or otherwise runs code that outputs to a display of the processing device 102, a graphical user interface for interacting with the communication platform 114.

Figure 2:
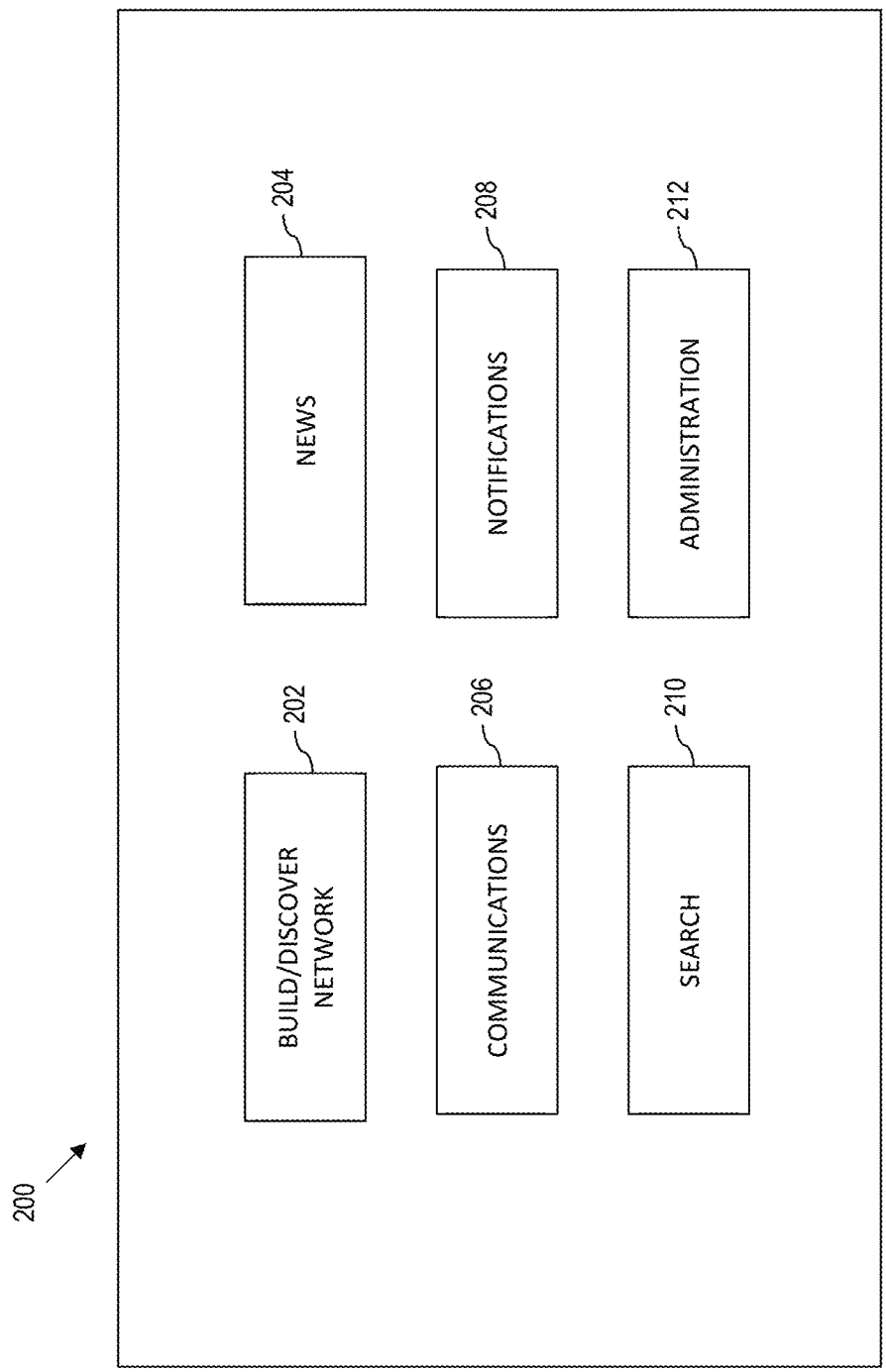
FIG. 2 is a block diagram of functions provided by a user interface on a processing device, e.g., smartphone, tablet, desktop or laptop computer, etc., that interacts with the communication platform of FIG. 1, according to aspects of the present disclosure.

Referring to FIG. 2, a block diagram 200 illustrates example functionality provided by a graphical user interface of a processing device (e.g., processing device 102, FIG. 1) interacting with a communication platform (e.g., communication platform 114, FIG. 1). The block diagram 200 can be implemented as a program, app, or other suitable interface and can include any combination of features as described herein. Example features include a build/discover network process 202, a news process 204, a communication process 206, a notification process 208, a search process 210, and an administrative process 212.

The build/discover network process 202 provides a graphical environment on the user's processing device (see processing device 102, FIG. 1) where the user can explore, build, remove, modify, or otherwise influence content and/or relationships within the communication platform (see communication platform 114, FIG. 1). As will be described in greater detail herein, the build/discover network process 202 is driven by layers of rules, including role-based rules that influence visibility to other users, limit permissions that enable a user to connect to another user, and otherwise control network building. The build/discover network process 202 can also be used by the user to gain access to content, such as product information, news articles, promotional banners, educational content, company lists, or a combination thereof.

The news process 204 is used to provide a curated news feed to users, e.g., based upon topics deemed by the communication platform to be of interest to an associated user. Here, topics can be news topics/news articles, or other information or content accessible by the platform, which may be deemed of interest to the user. Examples of such content can include, but are not limited to product information, promotional banners, educational content, research articles, company lists, announcements, standards/best practice guides, updates to regulations, company announcements, company offers, or a combination thereof.

Thus, the news feed is not limited to strictly "news" but rather, is directed to content that might be deemed of interest to the user. In this regard, a "newsfeed" and a "content feed" can be used interchangeably herein. Again, layers of rules can influence the selection, presentation, aging, format, etc., of the curated newsfeed. Moreover, the newsfeed herein can control and direct communication, which is launched or otherwise initiated from within the newsfeed system, as described more fully herein. Yet further, the build/discover network process 202 can interact with the news process 204 to limit and/or influence communications, including direct communications implemented responsive to a curated newsfeed, examples of which are described in greater detail herein.

The communication process 206 can be utilized to carry out directed communications, such as by posting to a feed, by starting one-on-one or group chats, communicating through threads, forming communicative connections responsive to action taken while interacting with curated news, by facilitating in-platform video calls, emails, text messages, telephone/voice calls, sharing photos, documents, etc. In example implementations, communications can be public or private, secure, HIPAA compliant, or take on any other layers as the application dictates. Moreover, the communication process 206 can interact with the news process 204 and build/discover network process 202 to carry out functionality described more fully herein.

As will be described in greater detail herein, in some embodiments, no user's personal contact information is exposed when communicating through the communication platform. For instance, an email address may be utilized to register and create an account with the communication platform. However, that email address is not exposed to other users by the communication platform.

As another example, in some embodiments, the communication platform provides a communication resource where telephone calls, video calls, text messages, combinations thereof, etc., can route within the app/communication platform. The communication platform intermediates the communication so that no telephone number, mac address, email address or any other identifiable personal information is exposed to the recipient. As such, all routing associated with direct communication between two or more users can be handled by the communication platform in such a way that a user can control the exposure of personal information.

As noted above, in some embodiments, no telephone numbers or other contact information is required or shared in order to communicate between users of the communication platform. This solves a significant problem with traditional communication methods. For instance, when an individual such as a clinician reaches out to a company, the clinician is typically exposed to endless follow-ups from that company because, traditionally, the clinician has exposed personal contact information to the company. However, aspects herein provide a user-friendly, safe platform that encourages communication by providing an environment for communicating without revealing personal contact information. For instance, in the context of an example where the user is a clinician, the clinician can communicate through the communication platform with a company employee such as a sales representative of a business of interest to the clinician. The clinician can then disconnect with the company, and the employee(s) from that company will no longer be able to see or communicate directly with that clinician within the communication platform.

Another problem is that individuals frequently utilize a common smartphone for personal and professional use. However, according to aspects herein, all communications can be consolidated within the app/communication platform, creating an easy-to-locate repository of industry/work/professional communications, keeping those professional communications separate from their personal communications (in their typical text app or phone app).

The notification process 208 provides a location to collect communications that are received for the user so that the user can access the notifications and review them as time permits.

The search process 210 provides a search facility to find content on the communication platform. For instance, the search process 210 can be used to find users, companies, news articles, product information, combinations thereof, etc. By way of example, the communication platform can aggregate information on products that are of interest to specialty groups such as clinicians, such that a clinician can search for products of interest across various manufacturers. The clinician can use advanced filtering within the app to focus searches, e.g., based upon product type, products covered under specific contracts, etc. The various examples herein are presented by way of illustration and not by way of limitation to the scope and capability of the search process 210.

The administrative process 212 provides a graphical user interface that enables a user to manage their on-line experience with the communication platform, such as to manage log-on information, user credentials, roles, profile information, groups, etc.

By way of a non-limiting example, according to aspects of the present disclosure, a process for interacting on a communication platform is provided. The process comprises storing in a data source associated with the communication platform, a user profile of a user registered to utilize the communication platform (see for example, user data 118 on communication platform 114, FIG. 1). The process also comprises filtering content for the user from a collection of content available to the user based upon at least one of data in the user profile, and data associated with the content. (See for example, content 122, FIG. 1; Build/Discover Network Process 202, FIG. 2; Search 210, FIG. 2). Yet further, the process comprises communicating the filtered content to a display of a processing device for viewing by the user (see processing device 102, e.g., a smartphone, FIG. 1), and opening a user-selected item of content for viewing on the display of the processing device.

Figure 5:
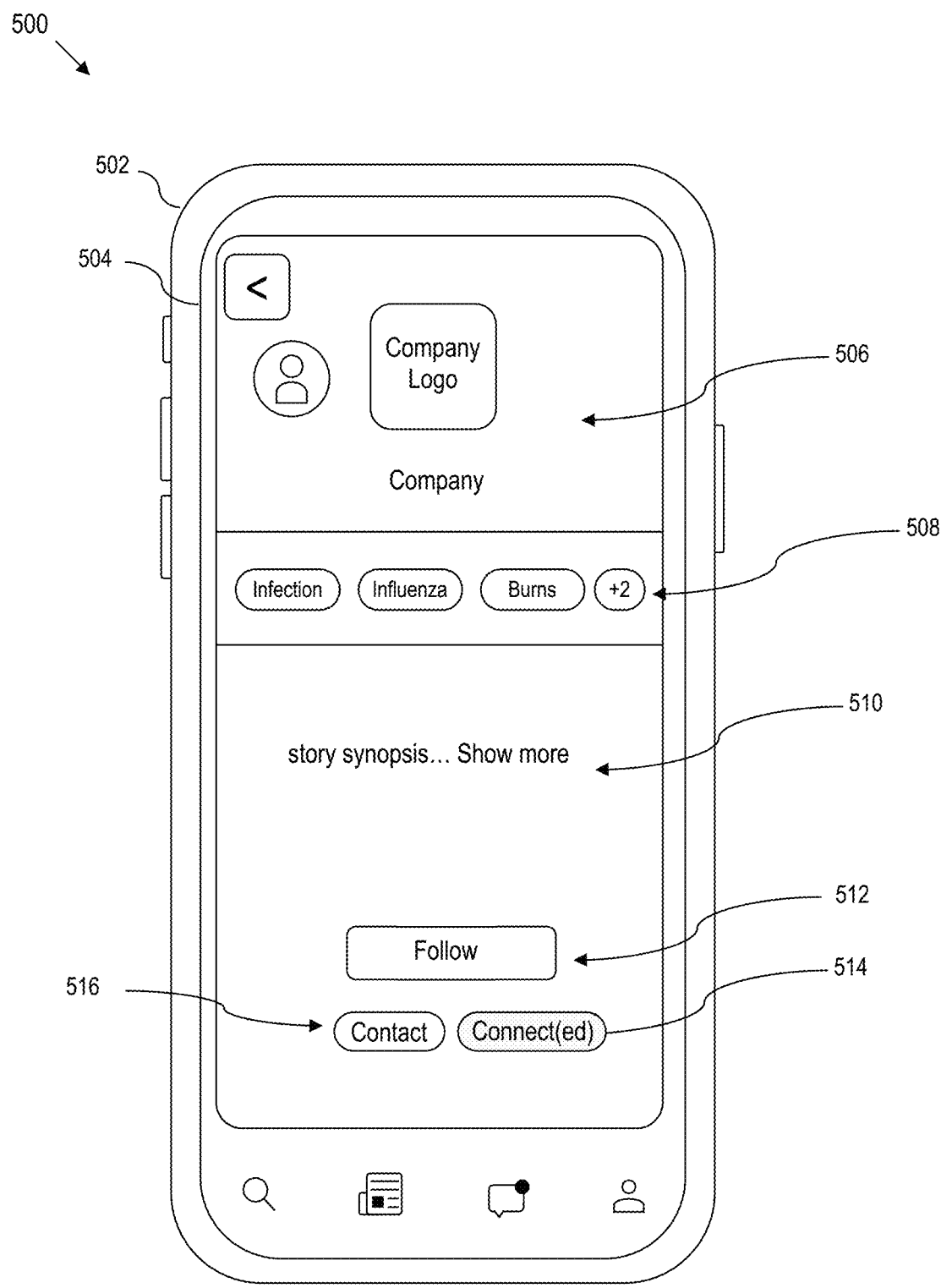
FIG. 5 is an example user interface implemented as an app on a smartphone for displaying a newsfeed provided by the communication platform of FIG. 1, according to aspects of the present disclosure.

Additionally, the process comprises displaying a user-selectable contact icon on the display of the processing device, examples of which are described more fully herein, see for example, FIG. 5). Upon selection of the contact icon by the user, the process comprises facilitating by the communication platform, a direct communication with a specific contact of a content provider associated with the user-selected item of content, where the specific contact is associated with the user by a relationship on the communication platform, and the direct communication is independent of the content itself (see Communications 206, FIG. 2). In some embodiments, the process further comprises limiting the filtered content to items of content associated with content providers for which the user has a relationship or for which the user can form a relationship based upon rules defined by the communication platform that associate the user with a corresponding group, as described more fully herein.

Example Communication Platform—Clinician

Referring generally to FIG. 1 and to FIG. 2, while not intended to be limited in any way, the communication platform 114 (FIG. 1) can function as an on-line networking and communication platform for clinicians, for individuals and companies that work with clinicians, for individuals and companies that provide resources to clinicians, and to other entities that are of interest to clinicians. In this manner, the communication platform 114 can facilitate communication between clinicians and those of interest to clinicians, e.g., healthcare product companies, medical resource providers, medical news providers, etc.

By way of example, users can include clinicians, companies, sales representatives, educators, researchers, service providers, etc. Each user in this example, has a role, and that role dictates the user's experience on the communication platform.

Clinician

A clinician uses the communication platform to consume content, e.g., to find, connect, communicate, promote and learn about information related to patient care or other areas of interest to the clinician. In this regard, the clinician creates a profile identifying the user in the role of "clinician". In general, the clinician profile defines characteristics that are useful to understand the interests of the clinician, e.g., by associating the clinician with attributes such as areas of practice, areas of interest, location, etc.

This role designation enables the clinician to seek out companies that are also users, and to connect to a company and/or specific members of the company. Typically, the clinician is given the opportunity to accept or decline an invitation by another user, or to proactively invite a connection to another user. Thus, the clinician can block, restrict access, or even block knowledge of the clinician's presence on the communication platform from other users.

By comparison, certain user roles do not have permission to seek out and connect with clinicians. For instance, an example embodiment defines a role as an entity contact, such as a sales representative for a company. Here, the role of sales representative precludes the user from sending unsolicited invitations to clinicians.

Moreover, the clinician can connect to companies, other clinicians, follow groups or individuals on the communication platform, etc. In a working example, the clinician can discover companies, learn more information about them, their products and/or services, follow them, connect to them, combinations thereof, etc.

An aspect of the present disclosure is that some embodiments facilitate and assist users (e.g., clinicians) in finding those entities that are likely to have an interest to the clinician, e.g., by filtering the clinician's exposure to other users based upon attributes such as area of practice, geographic location, area of interest, etc.

Regardless, once a relationship is formed between a clinician and an entity, that relationship can drive down to a personal, one-on-one relationship between the clinician and a specific, designated contact associated with the entity. For example, assume a clinician that specializes in wound care discovers on the communication platform, a company that provides a wound care product of interest to the clinician, e.g., a wound dressing. However, the company also provides other products, which are not related to the specific wound care interests of the clinician.

The communication platform also enables the creation and management of a link/relationship between the clinician and the company that keeps the focus/exposure limited to products, news, and company information that is of interest to the clinician. For instance, in an example embodiment, the communication platform enables the creation and management of a link/relationship between the clinician and a particular contact within the wound care company (e.g., a sales representative that covers the clinician's territory, a technical support person, etc., that has specific knowledge of the wound dressing, etc.).

As another example, the communication platform may present to the clinician, a directory or other data representing to the clinician, only the product support/salespeople from the company that are responsible for the company's wound care products, etc. In some embodiments, the communication platform enables the clinician to see contacts of the company that have knowledge of the wound care product of interest and filters out contacts that have no relation to the wound care product of interest to minimize irrelevant noise to the clinician.

With this specialized relationship in place, the clinician has a known contact within the company. Moreover, as described more fully herein, by utilizing the communication platform to maintain and manage contact information, the clinician does not have to take extra steps to record, save, or otherwise index the contact information as this is handled by the communication platform. In some embodiments, the communication platform not only manages the relationships, but also manages the communications so that the clinician does not even reveal to the contact within the company, any specific personal information of the clinician.

By way of illustration, in an example embodiment, clinicians can "connect with" companies in their selected areas of clinical interest. Here, companies can be discovered by the clinician, recommended to the clinician by the communication platform, etc. This gives the clinician the freedom to contact an assigned local company contact (or contacts), such as by audio, video, message, etc., at any time. Each company can decide who from the company will be customer-facing on the communication platform, such as based on geography and/or other select attributes provided by the communication platform.

In some embodiments, the clinician can select the individual within the company to create a direct relationship to create a contact with an entity. Here, the communication platform can present a directory, list of candidate connections, or present the clinician with options in any desired format. In other embodiments, the clinician can be assigned an individual contact, e.g., based upon rules that are carried out by the communication platform.

Other Roles

Other roles can include that of a medical device company, medical device company representative, distributor, clinical research organization, standard of care/guideline organization, practitioner support staff, biopharma company, biopharma company representative, medical news provider, security provider, insurance provider, hospital association, technical support provider, etc. Each permitted user has an associated role, each role having a profile that defines permissions, rights, exclusions, and restrictions within the communication platform. Each profile can also include attributes that can be utilized by the communication platform to filter, search, etc.

Two-Sided Directory

With specific reference to FIG. 1, the communication platform 114 can include data sources 116 to store information, including user data 118 (e.g., user profile data) and entity/contact data 120 (e.g., sales representatives and their associated companies). The communication platform 114 can utilize information sufficient to create a virtual directory. In some example embodiments, the directory can sort/filter based upon attributes of interest, such as a known institution, clinical area, role, location, company, site of care, user role, etc. This approach allows the communication platform to extract and associate user profile data to create relationships, e.g., to associated user profile data (e.g., clinician profile data) and service representative profile data (e.g., sales representative profile data) to map clinicians to sales representatives, etc.

In some embodiments, the clinician can initiate a connection with a sales representative within the communication platform 114. However, a sales representative may not be able to initiate a connection to a clinician due to the role permissions set up by the communication platform, as noted more fully herein.

Directory

Figure 3A:
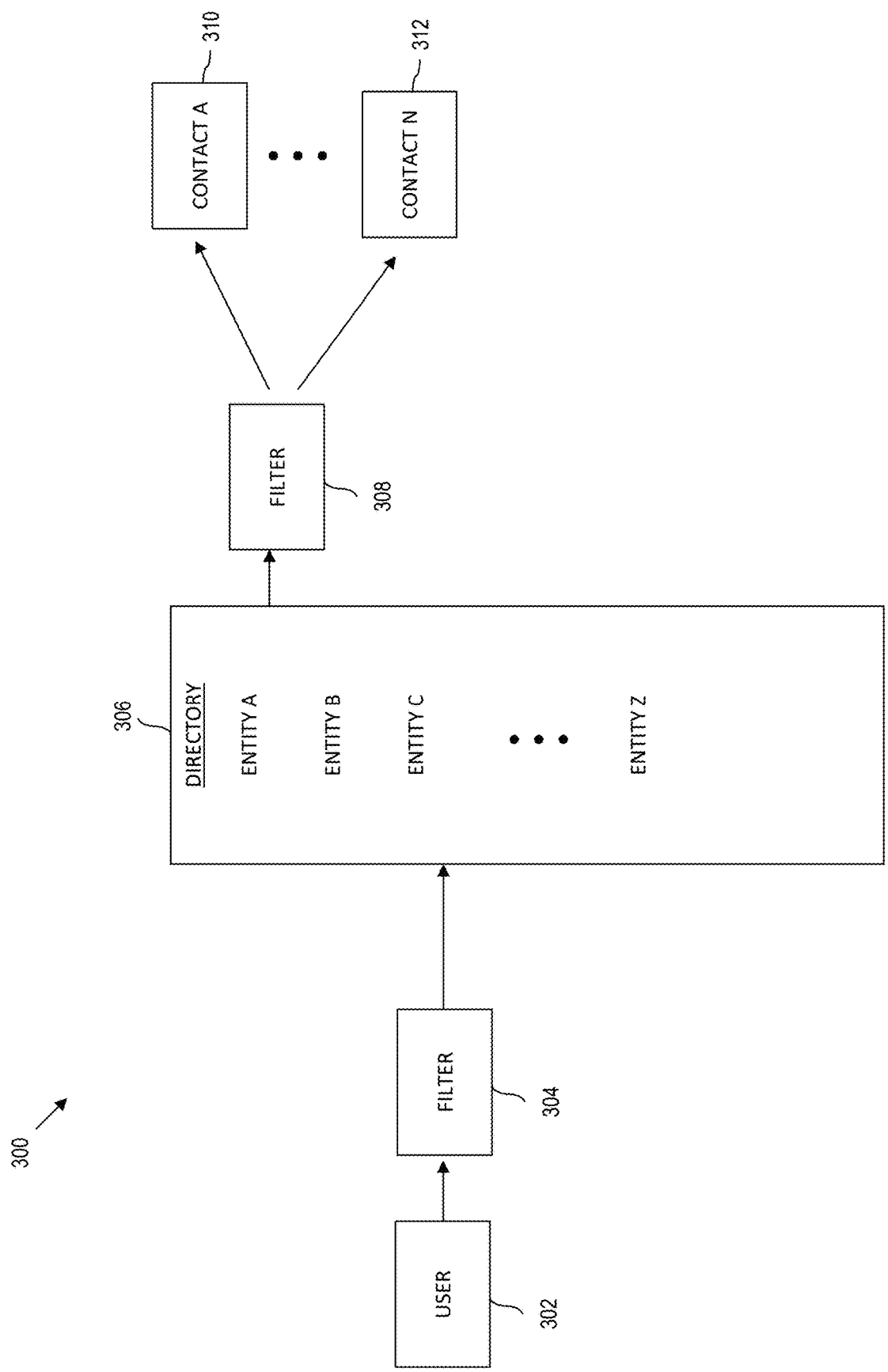
FIG. 3A is a schematic diagram illustrating a user interacting with a directory to form relationships with contacts associated with a selected entity using the communication platform of FIG. 1.

Referring to FIG. 3A, a schematic illustration is provided of a directory utilization process 300. The directory utilization process 300 can be implemented by the communication platform 114 (FIG. 1) and demonstrates a simplified example of a user (e.g., a clinician in the above example) connecting to an entity and forming a relationship with a contact associated with the entity. As will be described in greater detail herein, the directory utilization process 300 can be integrated into a graphical user interface, into newsfeeds, into content delivery, into search features, in other applications, etc., examples of which are described herein.

In this example, a user 302 (such as a clinician, or other type of user) interacts with a processing device, such as smartphone running an app, tablet running an app, desktop computer running a web browser that has loaded a website associated with the communication platform, etc. Through a graphical user interface, the user 302 navigates to a visual directory that identifies entities on the communication platform.

In some embodiments, the communication platform may apply a first filter 304 to a directory. The first filter 304 may be based upon a search entered by the user 302 into the user interface. In another example, the first filter 304 may be based upon criteria extracted from a profile associated with the user 302 on the communication platform, e.g., a practice area, geographic location, an area of interest, etc. After optional filtering, a directory 306 is presented to the user 302, e.g., via a graphical user interface of the user's processing device (102, FIG. 1). The directory 306 can be a list of entities (e.g., companies) that match criteria in the first filter 304. The directory 306 can be navigated by the clinician and the clinician can connect to one or more of the entities in the directory 306, e.g., such as by selecting a "CONNECT" button, or by engaging another visual metaphor, examples of which are described more fully herein.

In some embodiments, the user 302 can drive down into a selected entity to see individuals, groups, or other profiles associated with the selected entity. For instance, a selected company may have numerous employees on the communication platform, each with a profile. Here, the communication platform can optionally run a second filter 308, e.g., to filter company profiles into those that are a match with the clinician 302, e.g., by filtering to those company profiles (e.g., sales representatives) that have a similar/matching characteristic to data in the clinician profile (e.g., location, clinical area, site of care, territory, etc.). Based upon the optional second filter 308, the clinician 302 can select a contact, e.g., Contact A 310, Contact N 312, or any other available contact. The user 302 can then connect to the contact, invite the contact to connect, follow the entity and/or contact, or form a link, i.e., relationship.

The relationship is a feature within the communication platform that enables a user (e.g., the clinician in the examples herein) to immediately connect to a person associated with an entity that has knowledge/an ability to assist the user. For instance, by identifying Contact A 310 as the representative of Entity A that is the contact for the user 302 and establishing a relationship therebetween, the clinician can click on a "CONNECT" icon within the communication platform, which is associated with Company A, and the user 302 will be automatically routed to Contact A 310, based upon a selected direct communication channel that is provided within the communication platform (e.g., see communication process 206, FIG. 2). The above process can be repeated to establish relevant contacts and relationships between the user 302 and each company on the communication platform that supports the clinician. Moreover, the user 302 can seek out companies that are not currently related to the clinician within the communication platform to build new relationships.

In some embodiments, where multiple contacts match criteria of interest to a user (e.g., via the second filter 308), the contacts can be listed in any order, e.g., alphabetical. In some embodiments, the communication platform implements some matching that can look at historical information, trends, profile attributes, statistical measures, metrics, contacts associated with a trigger, or other factors to order the presentation of contacts. For instance, an embodiment can provide "matching" associated with newsfeed items, searches, or otherwise on the communication platform to provide a suggestion of a contact, to match directly to an exact contact, to provide a listing of qualified contacts, etc., from within a company if an associated clinician can be matched to more than one company employ.

As another example, the entity data source can be used to store contacts such as employees, which are labeled into or are otherwise associated with certain designated areas (e.g., sales, marketing, reimbursement, engineering, medical support, clinical support, etc.). When content is made available, e.g., a newsfeed article is posted, each item of content may be "tagged" by the company to designate the target recipient of inbound calls/texts from clinicians. For instance, content such as a post about reimbursements can designate the clinician's reimbursement contact (or at least the primary recommended person) within the company to be the recipient of any inbound inquiries for the corresponding post by the clinician. In another illustrative example, a company may assign their customer-facing people by clinical/product specialty, and by geography, or any other combination of parameters.

In yet another example, assume that a clinician is practicing in the field of cardiology in a hospital in New York, and the clinician searches for a cardiology product company. The clinician, or first filter 304 filters for cardiology product companies. The directory 306 identifies relevant entities that match the clinician filter requirements established by the first filter 304. In this example, a company filter (e.g., via the second filter 308) utilizes profile data regarding the clinician and matches that clinician to a local representative that is responsible for cardiology products handling the territory of New York.

As another example, content may be provided to the communication platform by an entity registered on the communication platform, which may cover a range of products, services, features, etc. In this example, the directory utilization process 300 can be leveraged to show to a clinician via the second filter 308, a salesperson contact, a clinical liaison person contact, and a reimbursement person contact as options, which the clinician can choose depending on the nature of their question. In yet alternative embodiments, the communication platform can select a preferred contact on behalf of the clinician as a starting point.

Thus, the first filter 304, directory 306, and the second filter 308 can utilize profile data regarding the user 302 (e.g., clinician), profile data regarding the entities on the communication platform, profile data on contacts of the entities on the communication platform, etc., to form relevant and automated directed connections between users of the communication platform.

The directory utilization process 300 can also provide options to waterfall/default/roll over to alternative options, e.g., as determined by the company within their preferences.

Group Relationships

In some embodiments, the platform includes the ability to define groups of users, and associate capabilities, limitations, exclusions, filters, or other restrictions and/or capabilities associated with the defined group. For instance, the platform feature data 124 (FIG. 1) can store data that enables the platform (e.g., 114, FIG. 1) to implement a "groups" rules engine. The platform can then use the data/rules/rules engine to carry out formulary filtering. In some embodiments, users can opt into one or more groups. In other embodiments, users may be automatically associated with or otherwise entered as a member of a group. For instance, a group can be created by a hospital system, an insurance group, a group based upon certification and/or training, or by any other suitable group organizer. In the example of a hospital, users such as clinicians that work for the hospital may be automatically enrolled into the group.

In an example implementation, the group organizer can establish a pre-filter/filterable view of entities, contacts, products, or any combination of searchable features on the platform, e.g., based upon previously established purchasing contracts, relationships, associations, or based upon any other criteria. Based upon the group settings, certain features on the platform can be viewable and/or discoverable, and some features can be hidden (e.g., filtered out) from members of the group. This allows, for example, clinicians within the group to view only products in a product database (e.g., a product database stored as content 122 (FIG. 1) on the platform that the group has enabled. The group organizer can for example, specifically include products, suppliers, etc., (implement inclusionary filter rules), exclude products, suppliers, etc. (implement exclusionary rules), combinations thereof, or otherwise apply any standard filtering technique. This allows a clinician to not be distracted by products that they cannot use or cannot otherwise get access to.

In some embodiments, the rules/filtering associated with a group may not apply to research, to news, to a specific role of the clinician, etc. This example allows a clinician the ability to log onto the platform for a specific purpose, e.g., to learn of new/emerging products when the clinician so desires, even where such products may not be formally approved by the group.

As another example, a clinician may want to attempt to discover new products. Thus, the clinician may have the ability to "switch" roles to affect the group filtering applied to what the clinician can discover. However, in this example, the clinician can "switch back" to a role where the group filtering applies. In yet other examples, a clinician may not have the ability to switch out of a group. For instance, the group organizer may have control to limit, facilitate, or even eliminate the ability of a group member to leave the group. The group organizer may also have access to controls that affect the scope of searches, contacts, or other parameters that affect a user's experience with content on the platform.

Yet further, in some embodiments, a group can affect interactions with an entity. For instance, a group can filter the contacts associated with an entity (e.g., via the second filter 308) based the group, clinician, specific user role, etc., as noted more fully herein. However, in other embodiments, the entity can also and/or alternatively filter based upon groups associated with the clinician. By way of example, groups can include a clinical institution associated with the clinician, a hospital group, an insurance group, a group based upon certification and/or training, or any other groups that define relevant characteristics of importance to entities. Here, users such as employees of a given company, agency, organization, etc., may only see, or may otherwise default to associated contacts of entities participating on the communication platform.

In this regard, groups can be utilized to further filter and form relevant and directed relationships, e.g., to users, products, news, or other platform content. Moreover, a user can be a member of more than one group. Thus prioritized and/or hierarchical group filtering can be implemented to select relevant contacts, see relevant products, or otherwise affect interaction with content on the platform. In this regard, groups facilitate content filtering so that efficiency is created, distraction is avoided, etc. Moreover, even though described in the context of a hospital/clinicians, the groups can be created and applied to other disciplines.

Additional Filtering Examples

As yet additional examples, filtering to match users (e.g., clinicians to contacts) can be based upon extrinsic factors (e.g., time, day, date, local, regional, world events, knowledge of seasonal events such as seasonal allergies, flu season, knowledge of a pandemic, catastrophe, planned event, etc.), a clinician's rank or priority to the entity, a priority mechanism within the entity to prioritize exposing contacts, relationships with other users on or off the communication platform, urgency, or some other measure of importance, efficiency or other metric of interest to the entity.

Of course, the concepts herein apply by analogy to applications other than that of a clinician platform.

Although described for sake of clarity in the context of a clinician, it should be appreciated that the concepts herein apply to other types of users, and is not limited to clinical, or any other specific field.

Traditional Contact

Entities such as companies typically want to encourage inbound communications from consumers to help them promote the use of their products. This is particularly important in the healthcare market, where patient safety and user feedback are important. Entities (providers in this example) achieve this conventionally (outside the communication platform) by placing their contact information within news articles, press releases or other forms of communication such as websites, packaging, instructions for use, etc. As such, when a consumer (e.g., clinician in the examples herein) see a news article or other trigger relating to a company or product of interest, that consumer must go through a multi-step process before being able to connect to their assigned (or ultimately assigned) contact. For instance, many providers use generic contact information that directs all incoming traffic to a common intake. From there, the consumer must assess details of company, then define/assimilate consumer information, and then find out from the company, who to talk to. At each step there is additional inconvenience for the consumer, and additional risk from the provider's perspective of attrition. Moreover, the delay from initial interest in communication until ultimately connecting with an individual can create workflow discontinuities and disconnects between the original intention of the contact and the actual engagement with the company contact. Reducing the number of steps required for a consumer to engage with their assigned company contacts would be an advantage for companies and consumers.

In this regard, embodiments herein provide various technical, computer driven mechanisms that improve the performance and usefulness of computer technology, resulting in dramatically reduced effort, time, steps, and processes necessary for a user of the communication platform to connect to an entity such as a provider company. In this regard, aspects of the present invention provide capabilities that are impossible to achieve with conventional approaches to establish connections between professionals and related entities.

For instance, aspects utilize a communication platform (e.g., communication platform 114, FIG. 1) in cooperation with a directory structure (e.g., the directory utilization process 300, FIG. 3A), and a graphical user interface on a user's electronic device such as a smart phone (see processing device 102, FIG. 1) to facilitate a "connect with" feature. The "connect with" feature is a "trigger" that is associated with an intelligent, selective, dynamically executable process that transforms the trigger, which may be presented in a generic format (e.g., a "Connect" icon), into a context specific implementation that utilizes a characteristic of the user (e.g., role, location, interest, purpose, etc.) and knowledge of the entity (e.g., a provider company) to associate the user with a selected and specific contact associated with the provider, in a manner that facilitates an ability to quickly initiate a direct communication with a relevant individual. For instance, within the communication platform, an entity such as a provider can be organized to have specific staff (contacts) assigned or assignable to users on the basis of criteria such as geography, role, or specialism. The approaches described herein avoid the above challenges and deficiencies in conventional/traditional ways to make contacts noted above.

For purposes of clarity, a few examples are provided herein. However, the concepts may be extended to other applications using the concepts described more fully herein.

Two-Sided Database Example

Figure 3B:
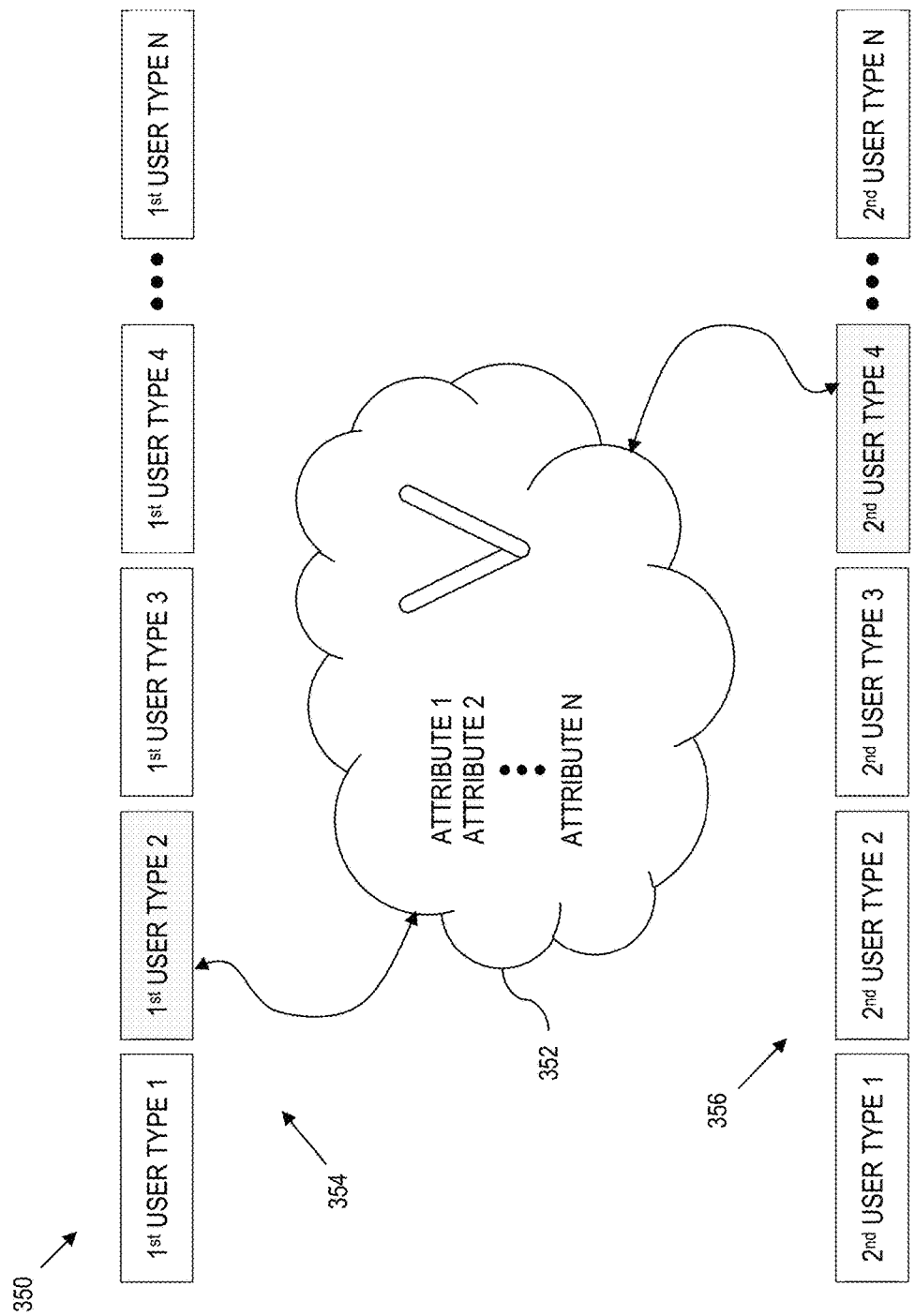
FIG. 3B is a schematic diagram of a two-sided database for forming relationships on the communication platform of FIG. 1, according to aspects herein.

Referring now to FIG. 3B, according to aspects herein, a two-sided database 350 can be utilized to facilitate certain matching features implemented herein. For instance, the two-sided database 350 can be utilized in/by the directory utilization process 300 as described with reference to FIG. 3A.

As schematically illustrated, a matching mechanism 352 provides matches between two different roles of users including a first user type 354 and a second user type 356. As a few illustrative examples, the matching mechanism 352 can comprise a matching engine that matches based upon attributes (e.g., see the first filter 304, directory 306, and the second filter 308, FIG. 3A), an artificial intelligence (AI) engine, a machine learning algorithm, a modeling system, etc. The matching mechanism 352 matches pairs that include a first user type 354 and a second user type 356.

By way of an illustrative example of a clinician platform, the matching mechanism 352 comprises a matching engine that matches based upon attributes. In this example, the first user type 354 comprises clinicians and the second user type 356 comprises entities/contacts. In this example, attributes can define by way of example, a role (e.g., clinician, sales contact, technical support contact, etc.), a clinical area, an institution, a site of care, a company, a location, territory, etc. The matching mechanism 352 matches pairs that include a first user type 354 and a second user type 356, in this example, matching a specific clinician to a contact associated with an entity. In practice, numerous matches can exist, e.g., a given clinician can include several matches, each match to a different contact. Likewise, each contact can have multiple matches to various clinicians.

In this manner, the communication platform can store established contacts, e.g., matches that are designated or authorized by the clinician. In other embodiments, the communication platform can generate new contacts, such as where a clinician is interested in exploring opportunities to obtain information from a company that is new to the clinician. In yet other embodiments, the matching mechanism 352 (e.g., a matching engine) can present options, e.g., in the form of a directory, listing, or other format to the clinician. Here, the clinician may elect among a group of contacts that have been pre-filtered for the clinician, e.g., based upon the attributes of interest to the matching mechanism 352.

In the above example, contacts are likely to know or have tools to store lists of the clinicians that they service. However, various clinicians may not know their appropriate contacts and/or clinicians may not have stored their contacts' information in a convenient and/or accessible manner. However, aspects herein organize contacts of the clinician in a professional and secure manner that organizes, consolidates, and isolates professional contacts from personal information.

In the above example, contacts are likely to want to share their information, e.g., in the context of a sales representative. Clinicians on the other hand, may not want to share their personal contact info (telephone/email) with their contacts. However, in the example herein, the communication platform can manage contact information in a way that respects privacy, security, confidentiality, etc. For instance, the communication platform provides platform specific telephone, video, and texting channels. Users communicate with other users(s) using the functionality provided within the platform and thus do not reveal external personal information (e.g., a clinician does not have to reveal a telephone number, email address, etc.). Thus, a clinician always knows the appropriate contacts for which the clinician has relationships, and the clinician can carry out direct communication with contacts on the communication platform without revealing or sharing (unless the clinician deliberately decides to share) the clinician's contact information.

Trigger

A trigger is a mechanism within the app and/or communication platform that initiates or otherwise facilitates an invitation to connect, facilitates an ability to communicate, initiates the formation of a relationship, etc. A trigger can also be implemented herein, as a capability that can be implemented in practice, as a characteristic found in content (electronic, physical, or otherwise) that can cause an electronic process of the communication platform to initiate an interaction, communication, or cause the creation of a contact between users of the communication platform.

As a few illustrative examples, a trigger can be associated within the communication platform, such as via a content item, news announcement, a newsfeed, article, biography, within the framework of the platform such as a button within a work area, as part of a specific screen, etc. A trigger can also be provided on physical media, such as a product advertisement, packaging, etc. By way of example, a trigger can be implemented as a barcode, QR code or other scannable or detectable indicia, a link, script, or other metaphor utilized to trigger action on the communication platform.

For instance, in some embodiments, certain "triggers" can be implemented that cause clinicians to want to speak to associated contacts. As an illustration, a trigger may comprise an icon such as a link in a newsfeed article, a product announcement, an advertisement, etc., that is consumed by the clinician on the communication platform, which initiates a situation where a clinician is using or is considering using one of the contact companies' products, and thus wants to ask a question, obtain information, etc.

As another example, a trigger may comprise an icon on content consumed by the clinician on the communication platform, e.g., a situation where a clinician wants to read a piece of information (such as news article, advertisement, press release, etc.) that is directed to providing information about a company or other entity associated with the content.

By way of example, a clinician can scan a QR code on a product, advertisement, etc. Scanning the QR code can launch a specific app (associated with the communication platform 114, FIG. 1) on the clinician's smartphone (processing device 102, FIG. 1). The app on the clinician's smartphone interacts with the communication platform (see FIG. 1) to facilitate a contact with a specific individual filtered uniquely to the clinician as described more fully herein, e.g., with reference to FIG. 1-FIG. 3B.

For instance, the app can point the clinician to a directory of one or more company contacts matched to the clinician, and the clinician can then elect to initiate a video call, phone call, or text to the appropriate contact (see examples associated with FIG. 3A and/or FIG. 3B). Here, the directory can be implemented as a graphical user interface that loads in a screen of the app to facilitate quick navigation.

As another example, a trigger can be associated with content within the app. When reading a piece of information about the company within the app's newsfeed or otherwise within the app, each piece of content can have an icon such as a graphical button, control, link, etc., that when engaged by the clinician, initiates forming a connection with (e.g., storing a relationship in a database associated with the directory 306), opening a communication with (e.g., initiating a telephone call, video call, sending a text message, etc.), or otherwise establishing a relationship with an appropriate company contact.

In an example embodiment, the user operates a processing device (see processing device 102, FIG. 1) having a graphical user interface (e.g., smartphone, tablet, laptop, desktop computer, etc.). An app, software program, web browser URL, or other code causes the processing device to display on a display screen, a user interface element, e.g., a graphical representation of a button, or other feature. Here, the user interface element defines a trigger. The connection between the user and the matched contact is facilitated responsive to the user selecting the user interface element (e.g., selecting, pressing, clicking on, or otherwise navigating to and selecting a "contact" button).

By way of example, a digital "contact" button can reside in a story, article, or other electronic content provided through the app, e.g., as part of a newsfeed provided by the communication platform, as a function in a work area or region of the display screen, etc. Regardless, the digital "contact" button functions as a trigger to enable the direct connection between the user and the matched contact if/when initiated by the app user. In other examples, the user interface element can be provided in some content available on the communication platform (in addition to or in lieu of a newsfeed), which is available to the user. In this example, the user selects the button, which triggers the app to enable a direct communication between the user and the matched contact. Here, the matched contact can be a contact associated with the content.

In some embodiments, analogous to a previous example with a QR code, when pushing this button, a directed, automated process electronically opens a communication from the clinician either to a specific contact or to a directory of one or more company contacts matched to the clinician. Thereafter, the clinician can elect to initiate a video call, phone call, or text to the appropriate/selected contact.

In some embodiments, the recipient of the communication is provided with detailed information that assists the user in responding to the contact. For instance, a sales representative that answers a directed communication from a clinician can be provided with data from the communication platform that provides context for the communication. For instance, the sales representative can be made aware of the news article from which the clinician pressed the "contact" button. The sales representative can also be made aware of the role of the person making the contact. Thus, the sales representative can know the specific article, news feed, document, content, flyer, etc., that prompted the communication. In some embodiments, the contact can quickly link to the electronic content that prompted the communication from the clinician, thus facilitating expeditious and on-point interactions.

Referring back to FIG. 3B, according to some example embodiments, the first user type 354 can "opt-in" to a relationship with an entity (e.g., a company) by "connecting" to them. For instance, keeping with the present example, a clinician can "opt-in" to a relationship with a company. In some embodiments, the relationship can be at a company level, or at a contact (e.g., representative) level or both (e.g., the clinician can opt into a relationship with a company to learn more about the company and products, then later, opt-in to a relationship with a specific company contact/representative). In other embodiments, opting into a relationship with a company can automatically trigger the matching mechanism 352 to match the clinician to a contact. Likewise, the clinician can "opt-out" of the relationship. In some embodiments, opting-in and/or opting-out can be unilateral, e.g., at the discretion of the clinician.

In some embodiments, once this connection is made (and only after it is made) direct communications (video/phone/text) can take place between the clinician and the appropriate contact(s) within the company. For instance, in a newsfeed, clinicians can see and read any listed story for which they are a match (e.g., based on certain matching criteria selected for each post and how that post synchronizes with each clinician). In this example, the clinician does not need to be previously "connected" to the company to see the company's news post. As such, in an example embodiment, when a clinician sees a news story and decides to contact an appropriate contact within that particular company, if the clinician has not previously "connected" to the company, this can be done first. For instance, a message can appear letting the clinician know that the clinician must first "connect" to the company. The app may automatically load the necessary interface to carry out the connection. Once the connection is made, the clinician can use any of the techniques herein to communicate with the company, e.g., via a contact of the company. For instance, the clinician can be taken to the directory of the appropriate contact(s) within the company.

As another example, independent of the above, each story, news article, advertisement, or other media may also have a "Connect" button, simply allowing the clinician to connect (without contacting) the company if the clinician had not previously connected to the company and would like to do so. Thus, the clinician can quickly form connections, form contacts (initiate direct communications), combinations thereof, all within the communication platform, in a secure manner.

Example—Smartphone User Interface

Figure 4:
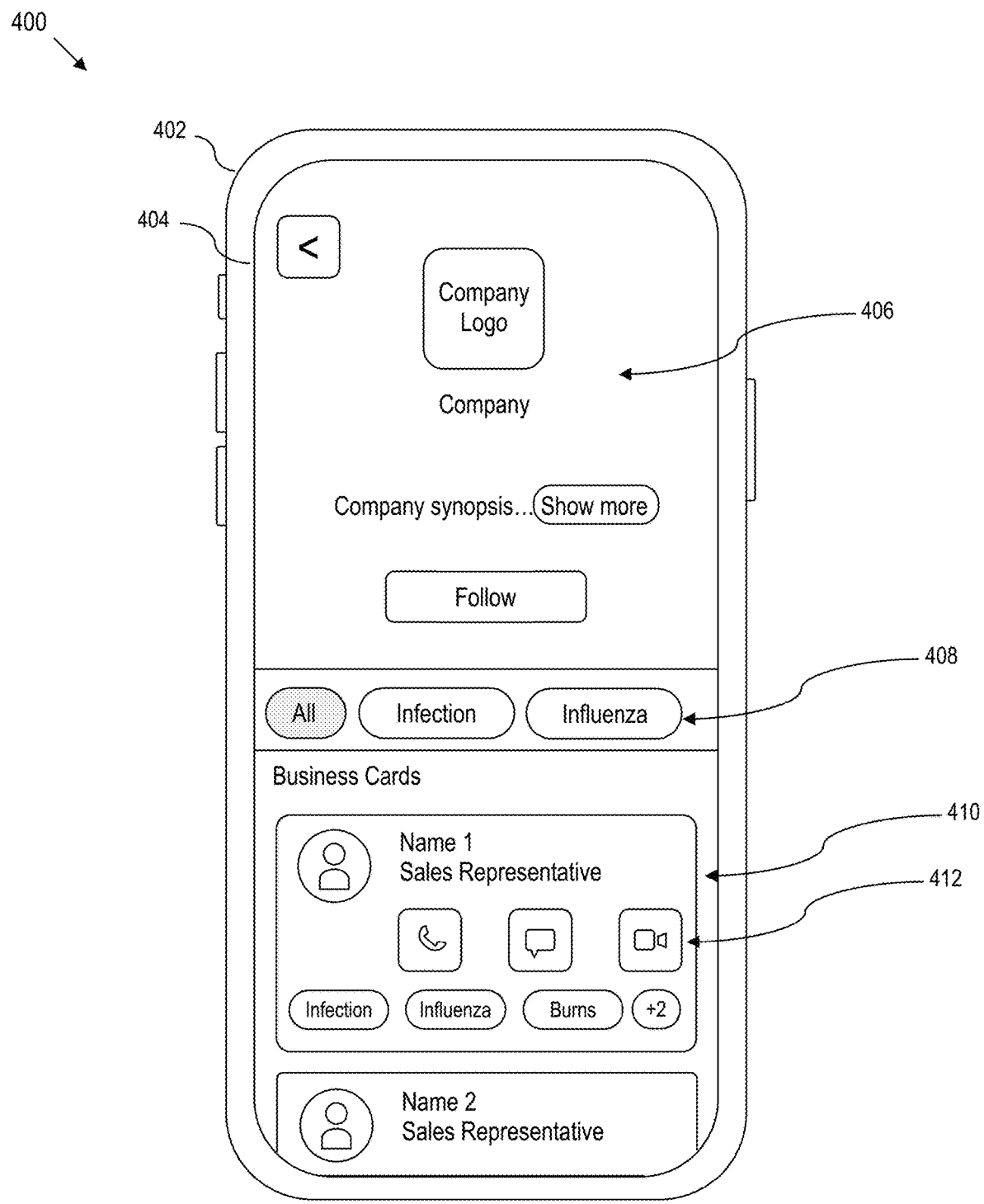
FIG. 4 is an example user interface implemented as an app on a smartphone that interacts with the communication platform of FIG. 1 to facilitate direct communication from within the communication platform.

Referring to FIG. 4, an example "contact user experience" 400 is illustrated in the context of a display of a processing device 402 implemented as a smartphone. In this regard, the processing device 402 is analogous to the processing device 102 of FIG. 1. In this example embodiment, the user has selected a company of interest and that company is brought up and is displayed on a display screen 404. The screen 404 presents data regarding the selected company at 406. Here, the displayed company may have been selected by virtue of navigating a directory (e.g., see directory 306, FIG. 3A; two-sided database 350, FIG. 3B), by utilizing a search feature (e.g., 210, FIG. 2) within the communication platform, by pulling up a contact/connection within the communication platform, etc.

The display screen 404 also illustrates a display section 408 that lists criteria associated with commonality and or common areas/interests between the user and the selected company. The criteria can be a list that scrolls sideways across the display screen 404 so that multiple factors can be presented. Moreover, the criteria can be hot linked so that selecting or deselecting one or more criteria changes the underlying contact cards 410.

The contact cards 410 show the individual(s) within the selected company for whom the user has established a relationship (or can establish a relationship in some embodiments). The contact card(s) 410 can also show the criteria in the display section 408 that matches the individual on the contact card 410 to the user (e.g., infection, influenza, burns in the example). Yet further, the contact card 410 includes direct communication icons 412, e.g., phone, text message, and video chat as illustrated. By pressing one of these icons, the communication platform triggers a direct communication between the user and the individual associated with the contact, e.g., as described more fully herein. For instance, if the phone icon 412 is selected, the processing device 402 can trigger a cellular call to the individual on the contact card 410, e.g., through the app and communication platform as described more fully herein.

In some embodiments, the app can remain open and active, even if moved to the background, so that the user can freely use other apps on the smartphone, move content between the processing device, e.g., smartphone app, text message app, video chat app, and the communication platform app, etc. As a few illustrative examples, a clinician can be on a video chat with a sales representative, pharmaceutical representative, surgical equipment technical support specialist, etc., flip the camera on the clinician's smartphone, and show the specialist what the clinician is looking at. The clinician can also maintain a communication, e.g., cellular phone call, while opening other apps, e.g., a calendar, calculator, notes, camera roll, etc., and continue to talk to the contact. As noted more fully herein, such communications are directed through technology of the communication platform, and are not based upon a direct communication between the clinician and representative. Thus, the clinician's personal information is not revealed to the representative.

In other examples, text messages can be used to schedule appointments, send photos, convey short messages, independent of, or while another communication channel is open. For instance, a clinician can text an image, photo, etc., which on a telephone call with a contact, etc.

In some embodiments, the communication platform keeps the assigned company contacts up to date by managing user profiles within the communication platform, monitoring profiles for changes, updates, etc., and by applying such changes.

Content Feed

As noted regarding FIG. 1, content providers, e.g., companies on the communication platform, can provide content, including news stories that will be presented in feeds on the communication platform. In practical applications, the news stories filter and target users based upon information in the user profiles stored by the communication platform, e.g., for the example case of clinicians, a newsfeed may sort by geography, clinical area of practice, institution, size, other filters, etc. Uniquely, if a user finds a news story of interest, the user can trigger a direct communication from within the news story to a relevant contact.

Referring to FIG. 5, an example, illustrated newsfeed 500 is provided for sake of clarity of discussion. A processing device 502 (e.g., analogous to processing device 402, FIG. 4, processing device 102, FIG. 1, etc.) includes a display 504 that displays a news feed. Solely for sake of clarity of explanation, only one news story is illustrated. However, in practice, a thread of news stories can be presented.

As illustrated, the illustrated display 504 shows a news story presented by company 506, where the story is associated with criteria 508. The display 504 also shows a screen portion that contains at least a synopsis of the news story 510.

In some embodiments, a "FOLLOW" icon 512 is provided. Such may be provided where a story is likely to generate a chain of comments, responses, reactions, etc., that are of interest to the user. Pressing this button causes the communication platform to send notifications to the user when there is an update or reaction to the newsfeed content.

In some embodiments, a "CONNECT" icon 514 is provided. The Connect icon 514 enables the user to form a connection to the source of the news story, e.g., the company. This "CONNECT" icon 514 triggers a connection in a manner analogous to that described above. For instance, pressing the connect icon 514 can trigger the communication platform to create a data link between the user and the content provider (e.g., company) via a directory (e.g., see directory 306, FIG. 3A; two-sided database 350, FIG. 3B), which will enable enhanced features of the communication platform that are reserved for those users that have a platform established connection.

In some instances, the user may already have a relationship with the content provider. Here, the connection icon 514 may change its display label to "Connected" to indicate to the user that a relationship has already been established.

In some embodiments, an optional "Contact" icon 516 can be provided. The contact icon 516 provides a direct or otherwise directed connection to an individual contact associated with the user/clinician, news story, the content provider (company) releasing the news story, combination thereof, etc. Here, the contact can be implemented in a manner analogous to that described more fully herein, e.g., with reference to FIG. 3A, 3B, FIG. 4, or a combination thereof.

The contact icon 516 is an example of a dynamic communication link on the communication platform. For instance, as noted in greater detail above, pressing the contact icon enables, facilitates, launches, triggers, or otherwise initiates a communication (e.g., phone, video, text) across a communication channel of the communication platform. For instance, a smartphone video conference can be initiated using the smartphone's Wi-Fi, cellular, or other communication capability. However, the clinician's processing device (e.g., 102, FIG. 1) communicates with the communication platform. The communication platform links the video with a video feed of the contact. In this way, personal information of the clinician, e.g., cellular phone number, etc. is not revealed to the contact. Rather, the communication platform remains an intermediary. In some cases, the video can be captured, routed, stored, archived, logged, or otherwise indexed by the communication platform, depending upon the application requirements.

Example Content Feed Process

Figure 6:
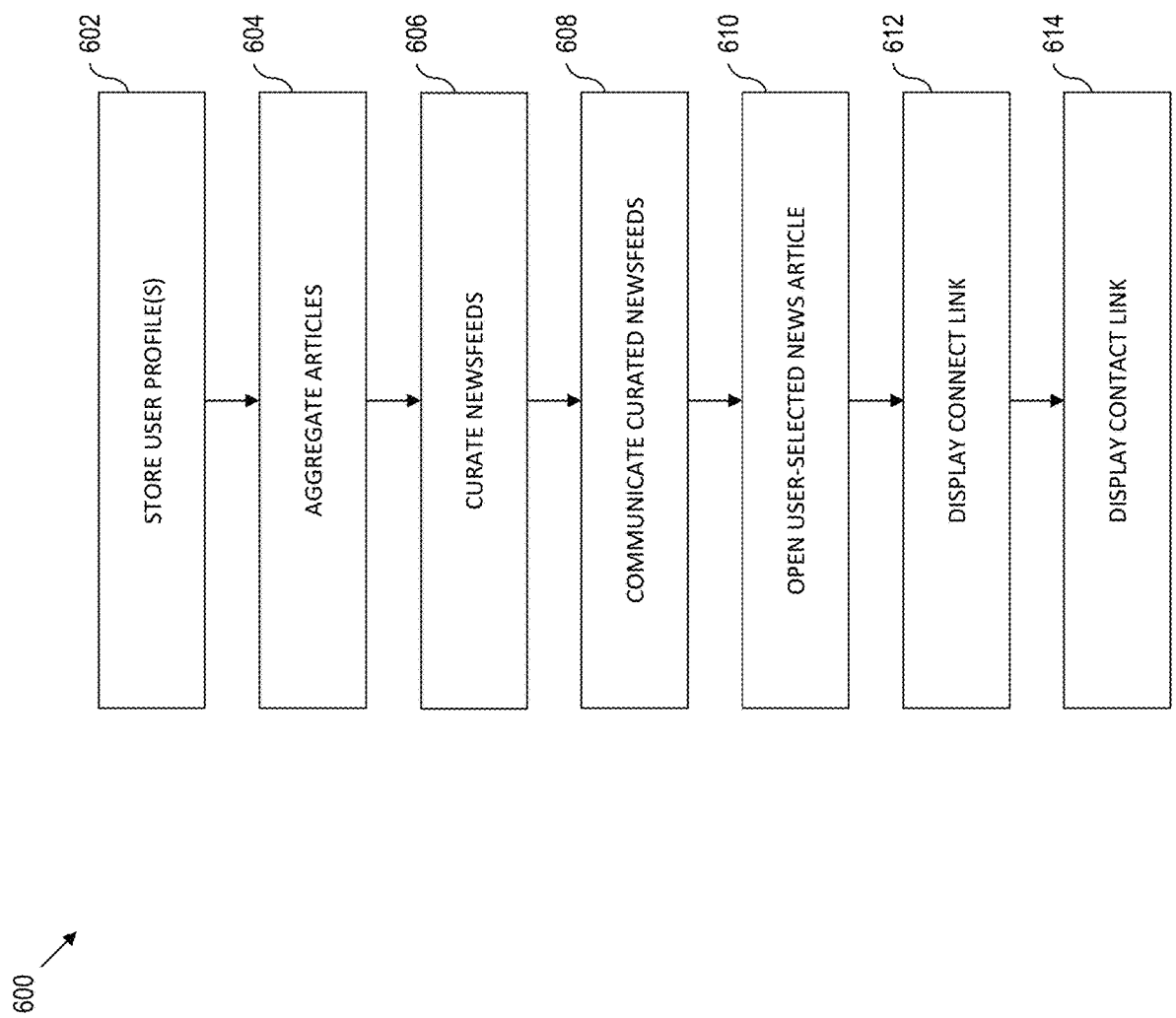
FIG. 6 is an example flow chart for building newsfeeds distributed by the communication platform of FIG. 1, according to aspects of the present disclosure.

Referring now to FIG. 6, a process 600 is illustrated for creating a dynamic communication link on a communication platform. For instance, the process 600 can be utilized to integrate the connection icon 514 (FIG. 5) functionality and/or the contact icon 516 (FIG. 5) functionality into a content feed or other content onto the communication platform described more fully herein.

The process 600 can optionally comprise storing at 602, in a data source associated with a communication platform, a user profile of a user registered to utilize the communication platform. For instance, as noted in greater detail herein, a user (a clinician in the above examples) has a profile that designates a role as clinician. The user profile stores various parameters/attributes associated with the user and the user's role, e.g., location, areas of interest, etc.

The process 600 can also optionally comprise aggregating at 604, content, e.g., articles and other information from content providers on the communication platform, where the content relates to information of interest to users. Here, content providers can be entities on the platform, users, etc. In some embodiments, each item of content (e.g., an article) can optionally have a content profile (e.g., an article profile) that defines an intended audience on the communication platform. As noted in FIG. 1 users of processing devices 102 can function as content providers, such as companies, news outlets, standards organizations, researchers, etc. Regardless, the content providers generate news articles that are submitted, acquired, obtained, or otherwise identified to the communication platform.

In an example embodiment, the communication platform aggregates the content into a news distribution system in a manner such that each submitted news story is processed, and potentially sorted, prioritized, indexed, etc. Not all news stories are necessarily distributed. Rather, only those received news stories that align with distribution rules of the communication platform may be distributed. For instance, distribution rules may be based upon matching criteria in the news profile (e.g., criteria 508, FIG. 5), with corresponding data in the profile of a corresponding user, etc.

The process 600 also comprises curating, at 606, a feed, such a newsfeed, for the user. In some embodiments, the newsfeed is curated for the user from a collection of aggregated articles (i.e., content), each article selected for the user based upon at least one of data in the user profile, and data associated with the article. As another example, the newsfeed can be curated by assembling select ones of the aggregated articles (i.e., content items), where each article is selected for the user based upon matching data associated with the article with data associated with the user. In some embodiments, the curated newsfeed articles can be limited to content providers for which the user has a relationship or for which the user can form a relationship based upon rules defined by the communication platform. In other embodiments, the user may be able to see all news articles.

As another example, the newsfeed can be curated for the user by assembling select ones of the aggregated articles/content items, where each article is selected for the user based upon matching data in a user profile, in data associated with the article (e.g., associated with an article profile), data associated with the source of the article, based upon external data (time, date, article age, article relevancy to some external trigger such as a local, regional, global event), combinations thereof, etc. In some instances, the curated newsfeed articles can be optionally limited to content providers for which the user has a relationship or for which the user can form a relationship based upon rules defined by the communication platform.

That is, the communication platform curates a custom newsfeed for each user. However, in practical applications, the number of articles/content items and the diversity of the articles/content items likely will make it unpractical for a user to see all articles. As such, if an article is not relevant to the user, then the article can be filtered out of the user's newsfeed. On the other hand, if the user has a connection with a company that posts an article, then that article may be considered a candidate for being placed in the user's newsfeed. In some embodiments, matching criteria, e.g., topic, content, relevancy, etc., may filter the news story into or out of the user's feed. For instance, a user may be connected to a large company, but only interested in a subset of products offered by the company. Here, product criteria associated with the story can be used as a filter. As such, other selection criteria can be used to affect the selection of articles curated into the user's newsfeed.

The process 600 further comprises communicating, at 608, the curated newsfeed to a display of a processing device for viewing by the user.

Yet further, the process 600 comprises opening, at 610, a user-selected article/content of the curated newsfeed for viewing on the display of the processing device. An example of communicating a curated newsfeed to a display of a user is described in greater detail herein with reference to FIG. 5.

Additionally, the process 600 optionally comprises displaying, at 612, a user-selectable connect link (e.g., displaying a user-selectable connect icon on the display of the processing device. In some embodiments, the connect icon is displayed at least while the user-selected article is opened and/or displayed. In other embodiments, such as for small screens such as smartphones, space may not allow the connect icon on the same screen as the content. As such, a process on the communication platform may trigger the display of the connect icon responsive to the user opening, closing, reading, or taking other action with regard to the content. Alternatively, the communication platform may automatically display the contact icon based upon some automated trigger.

In some embodiments, the optional connect link is displayed upon detecting that the user does not have a relationship with the associated content provider on the communication platform. Here, the connection link enables the user to connect with the associated content provider of the article as described more fully herein. As noted with reference to FIG. 5, a connection icon 514 provides a connect link to create a connection between the user and the content provider (e.g., company). In some embodiments the connect link is only provided when no previous connection exists. If a connection already exists, then this icon can be suppressed or hidden. In other embodiments, the connection icon can display a label such as "connected" to indicate a previously established connection. As this is an optional process, in some embodiments, there is no connect link regardless of relationship between the user and the content provider.

The process 600 also comprises displaying at 614, a user-selectable contact link (e.g., displaying a user-selectable contact icon on the display of the processing device at least while the user-selected article is opened and/or displayed). Upon selection of the contact icon by the user, the communication platform initiates or otherwise facilitates a direct communication with a specific contact of a content provider associated with the user-selected article, where the specific contact is associated with the user by a relationship on the communication platform, and where the direct communication is independent of the newsfeed.

By way of example, the contact icon can be implemented by the contact icon 516 described with reference to FIG. 5, using the directory or other matching described herein with reference to FIG. 3A, 3B, displaying a code such as a bar code, QR code, displaying an otherwise selectable visual metaphor, combinations thereof, etc.

As a few illustrative examples, and as described with reference to FIG. 3A, 3B and FIG. 5, in some embodiments, upon selection of the contact link by the user, the communication platform initiates or otherwise enables a direct communication with a with another user (contact), e.g., a specific representative of the content provider, by launching a graphical representation of a directory onto the processing device. As described more fully herein, the directory can limit viewable contacts to those individuals associated with the content provider that have or can form a relationship with the user on the communication platform. In some embodiments, each listing in the directory includes a contact icon that when selected by the user, initiates or otherwise enables the direct communication.

As an additional illustrative example, and as described with reference to FIG. 5, in some embodiments, upon selection of the contact link by the user, the communication platform initiates or otherwise enables the direct communication with a specific representative of the content provider by utilizing data in the user profile to identify the specific representative of the content provider that is associated with the user. Here, the platform enables the user to initiate or otherwise automate a communication, e.g., by automatically or manually triggering a select one of a telephone call between a telephone of the user and a telephone associated with the specific representative, a video call between a video device of the user and a video device associated with the specific representative, and an electronic text communication between a text communication device of the user and a text communication device associated with the specific representative.

According to yet further aspects herein, the communication platform can facilitate, upon selection of the contact icon by the user, direct communication with another user (contact) by outputting a graphical representation of a directory associated with the content provider onto the display of the processing device where the directory displays contacts of the content provider, and by receiving a selection from the user of the specific contact from the directory. The directory can be implemented utilizing a two-sided database that filters contacts associated with the content provider that have or can form a relationship with the user on the communication platform based upon at least one rule implemented by the communication platform.

Upon selection of the contact icon by the user, the communication platform can facilitate the direct communication with the specific contact of the content provider by facilitating a select one of a telephone call between a telephone of the user and a telephone associated with the specific contact through the communication platform, a video call between a video device of the user and a video device associated with the specific contact through the communication platform, and an electronic text communication between a text communication device of the user and a text communication device associated with the specific contact through the communication platform. Direct communication between the user and the contact is carried out through the communication platform without revealing to the contact, any personal contact information of the user, by using the platform as an intermediate of the communication.

In some embodiments, the communication platform causes to be displayed, a user-selectable connect link on the display of the processing device, e.g., at least while the user-selected content item is displayed. Here, upon the user selecting the connect link, the communication platform creates a data link between the user and the content provider. In some embodiments, the communication platform may cause to be displayed, upon detecting that the user does not have a relationship with the associated content provider on the communication platform, a user-selectable connect link on the display of the processing device, e.g., at least while the user-selected content item is displayed. Here, upon the user selecting the connect link, the communication platform creates a data link between the user and the content provider.

As noted in the examples provided throughout, the user profile can comprise an identification of the user as a clinician. Here, the user profile further comprises an area of practice of the user, a location of practice of the user, a group or groups to which the user belongs, an identification of companies and/or sales representatives of companies with whom the user has established a relationship, etc. on the communication platform. Moreover, in some embodiments, the user profile can comprise at least one of an area of practice of the user, and a location of practice of the user.

Each content item profile (e.g., article profile) can comprise that includes data utilized by the communication platform to determine an intended audience on the communication platform, the data including at least one of a role to which the content item pertains, a group to which the content item pertains, and an area of coverage. As another example, each content items profile/article profile can comprise at least one of an area of practice to which the article pertains, and locations of coverage.

In this regard, filtering content for the user can comprise matching the content item to the user where at least one of the role to which the content item pertains matches the role of the user, the group associated with the user matches the group to which the content item pertains, or the site of care of coverage of the content item matches the site of care of the user, etc.

As yet another example, filtering content for the user can comprise curating a newsfeed for the user on the communication platform, such as by matching the article to the user where at least one of: the area of practice in the article profile matches the area of practice of the user, or the location of coverage in the article profile matches the location of practice of the user.

In some embodiments, the user profile comprises at least one of a role of the user, and a location of the user. Here, each article profile comprises at least one of a role to which the article pertains, and an area of coverage. Also, curating the newsfeed for the user on the communication platform comprises matching the article to the user where at least one of: the role to which the article pertains matches the role of the user; or the site of care of coverage of the article matches the site of care of the user.

Yet further, in certain embodiments, the audience associated with an article comprises at least one area of practice associated with the corresponding article, and territory associated with the corresponding content provider.

News Article Creation

Referring to FIG. 7, FIG. 8, FIG. 9, and FIG. 10 collectively, a sample set of screen shots illustrates a process for hosting on the communication platform, a business unit administrator dashboard. In example implementations, the business unit administrator dashboard may be available only to those users of the communication platform having a business unit administrator role in their associated user profile. The administrator dashboard enables an administrator to make a selection within the business unit administrator dashboard that launches program code to create a news article.

Figure 7:
FIG. 7 is an example interface illustrating additional example details for building newsfeeds distributed by the communication platform of FIG. 1, according to aspects of the present disclosure.

For instance, as illustrated in FIG. 7, program code 700 illustrates a graphical user environment that prompts the business administrator to enter example information such as article details, e.g., a headline, and an article body.

Figure 8:
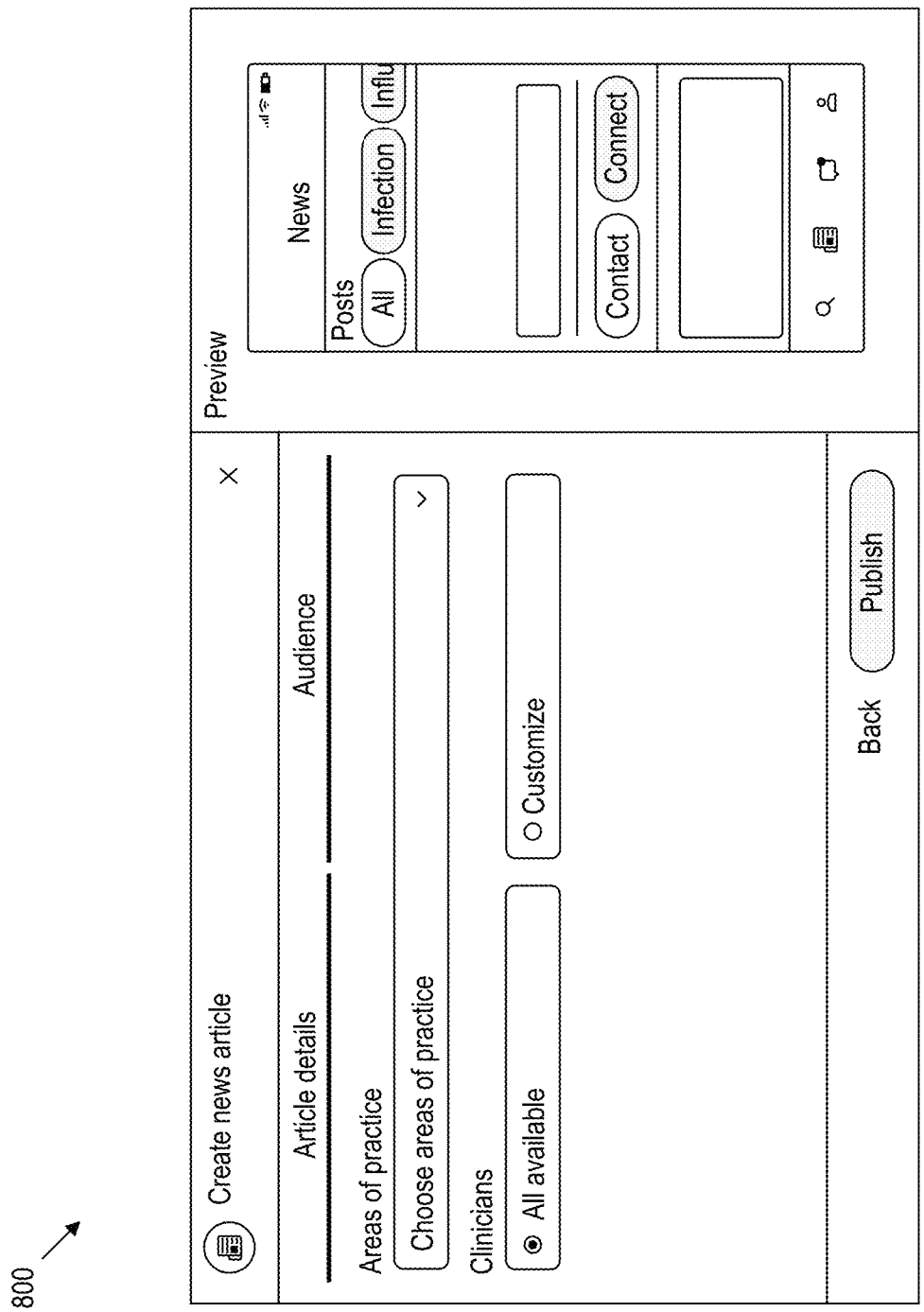
FIG. 8 is an example interface illustrating yet additional example details for building newsfeeds distributed by the communication platform of FIG. 1, according to aspects of the present disclosure.

As illustrated in FIG. 8, program code 800 illustrates a graphical user environment that prompts the business administrator to enter in the example fields, areas of practice, and a broadcast scope.

Figure 9:
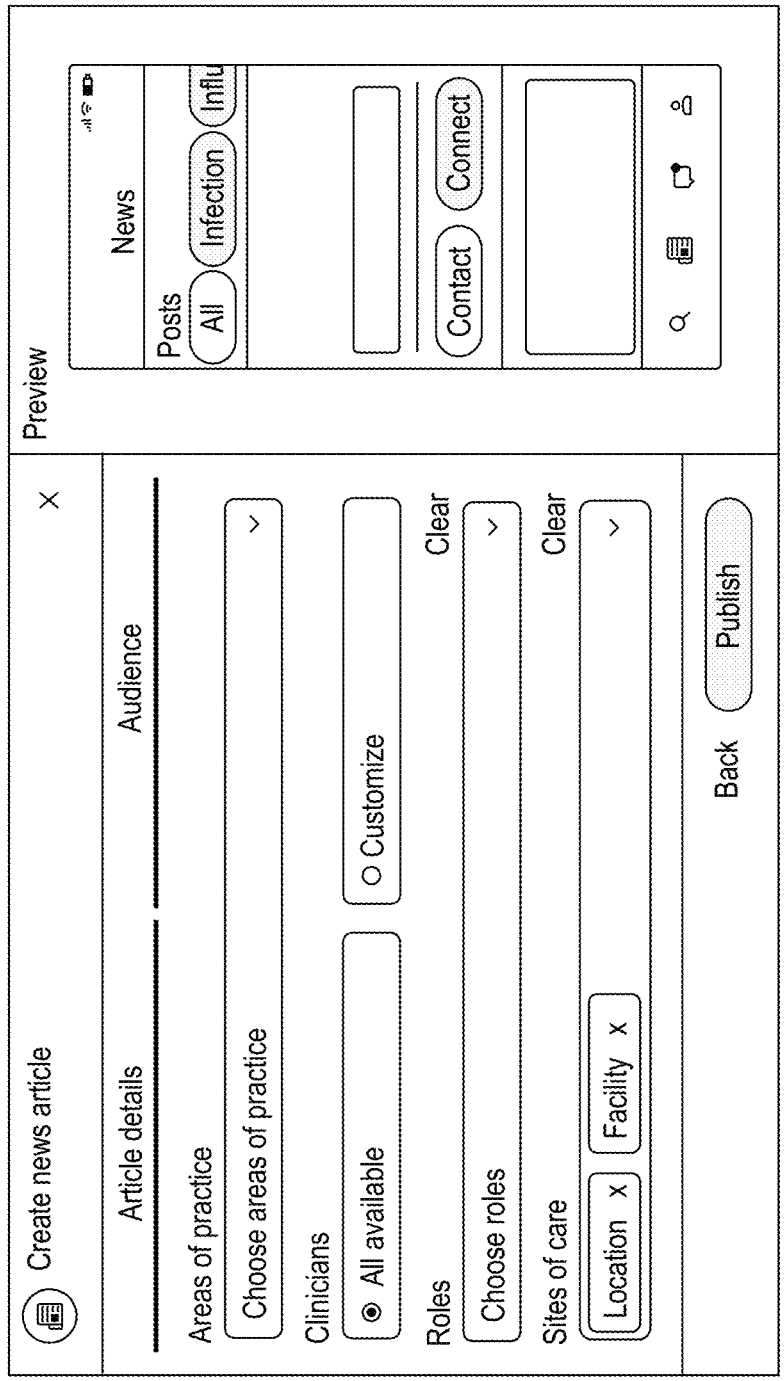
FIG. 9 is an example interface illustrating still further, additional example details for building newsfeeds distributed by the communication platform of FIG. 1, according to aspects of the present disclosure.

As illustrated in FIG. 9, program code 900 illustrates a graphical user environment that prompts for additional information, such as the addition of entering roles and sites of care.

Figure 10:
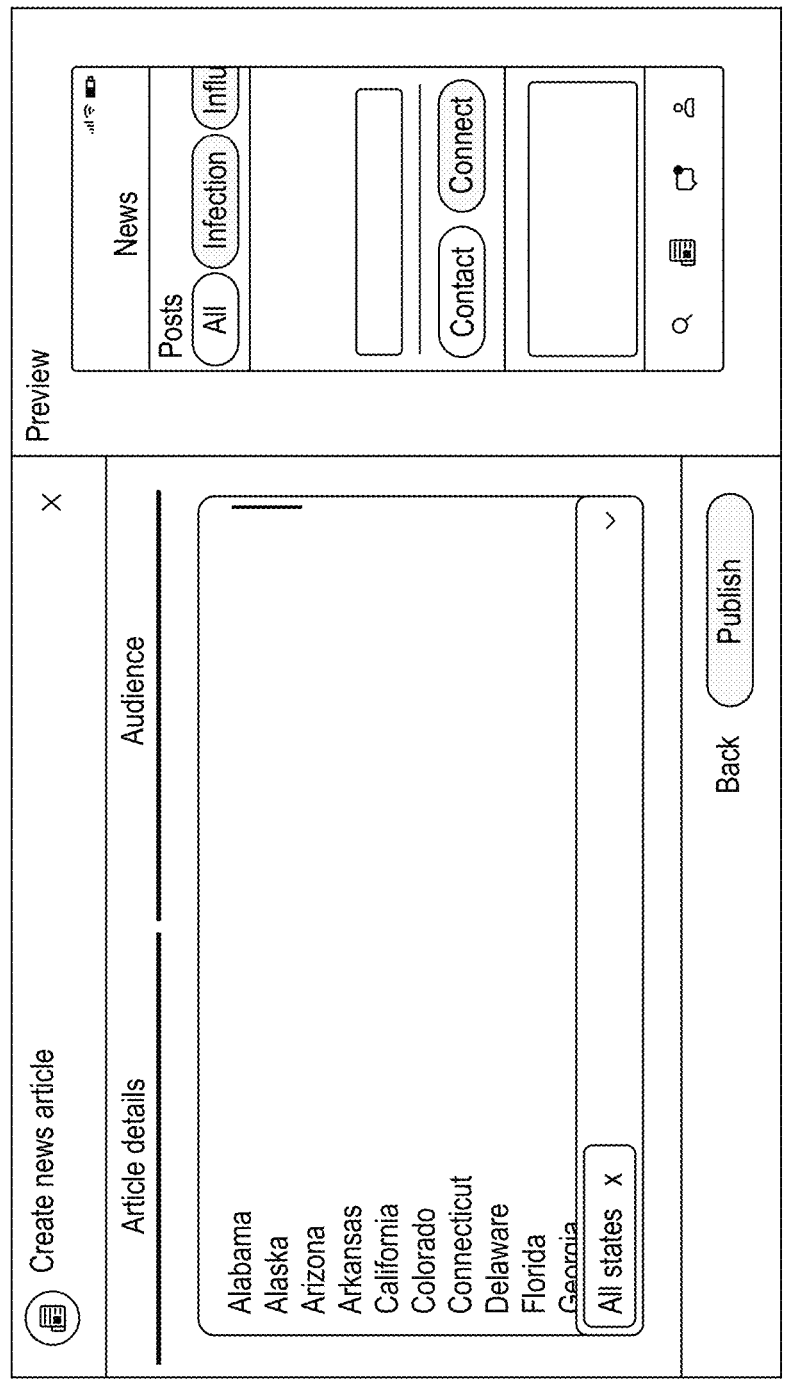
FIG. 10 is an example interface illustrating yet further additional example details for building newsfeeds distributed by the communication platform of FIG. 1, according to aspects of the present disclosure.

As illustrated in FIG. 10, program code 1000 illustrates a graphical user environment that illustrates an example manner of collecting geographic data (e.g., from a selection list).

As illustrated in FIG. 7-FIG. 10, the newsfeed creator also provides a selection within the business unit administrator dashboard to launch program code to implement an "Articles" view that graphically displays a thumbnail of an image and article name for past articles that were published on the communication platform.

In some embodiments, the processing device displays a tab that launches a view of the article. Here, the process further comprises an icon on the display that enables the user to filter curated news posts according to an area of practice of the user.

In yet some embodiments, the processing device displays curated news feed as snippets, where one snippet is associated with each curated article. Here, the processing device implements code such that when a user taps on the snippet, the article opens for full viewing, wherein at least one visual element is different for the displayed article depending upon whether the user is connected to the content provider, or whether the user is not connected to the content provider.

In still other embodiments, the curated articles each have an aging attribute such that older articles age out of the news feed for the user.

As used herein, the term "newsfeed" is to be considered broadly, and can encompass news, an article, an advertisement, or any form of electronic publication or content. Moreover, the "contact" functionality, e.g., see contact button 516 (FIG. 5) can be implemented in alternative ways, such as a scannable code, e.g., QR code, or other visual or otherwise actionable metaphor.

Clinician Filtering

If a user is connected to an entity, e.g., a company, the user's contact within the company can push to the user, messages, news, video, documents, and other content that the user may find of interest. Also, when a user permits, the representative can initiate audio and video calls to the user.

Aspects herein provide a communication channel that's designed to feature a role of user, e.g., clinician, and provide centered functionality that enables the user to control contact with others on the communication platform. In some embodiments, direct communication is facilitated through the communication platform without requiring that personal contact information of the clinician is revealed.

Also, in some embodiments, companies are provided with tools to assist users, e.g., clinicians, to carry out on-demand product support when making clinical decisions or when using complex devices & therapies. For instance, an always up-to-date contact list maintains an aggregation of companies and their company representatives. In some embodiments, e.g., including clinicians, the communication platform supports clinician-initiated audio & video calls. In some embodiments, the communication platform does not allow inbound calls from sales representatives to clinicians that are unsolicited. However, entities can create media, e.g., news articles, embed codes (e.g., QR codes) on media, product packaging, etc., and like that content to triggers to facilitate rapid access for users to contact the entity or entity contacts.

Some embodiments herein provide a mobile-first solution that enables users to call from anywhere, and easily share what they're seeing with tools that are HIPAA compliant. Moreover, using the app associated with the communication platform provides separation of work and personal communication channels (e.g. the need to share their personal phone numbers with reps, or have company texts sitting among their personal messages.

Example Scannable Code

Referring generally to FIG. 11-FIG. 14, another example 1100 is provided for a "Connect With" function. In this illustrative example the connect functionality is implemented in the form of a scannable code, such as a bar code, QR code, etc.

Figure 11:
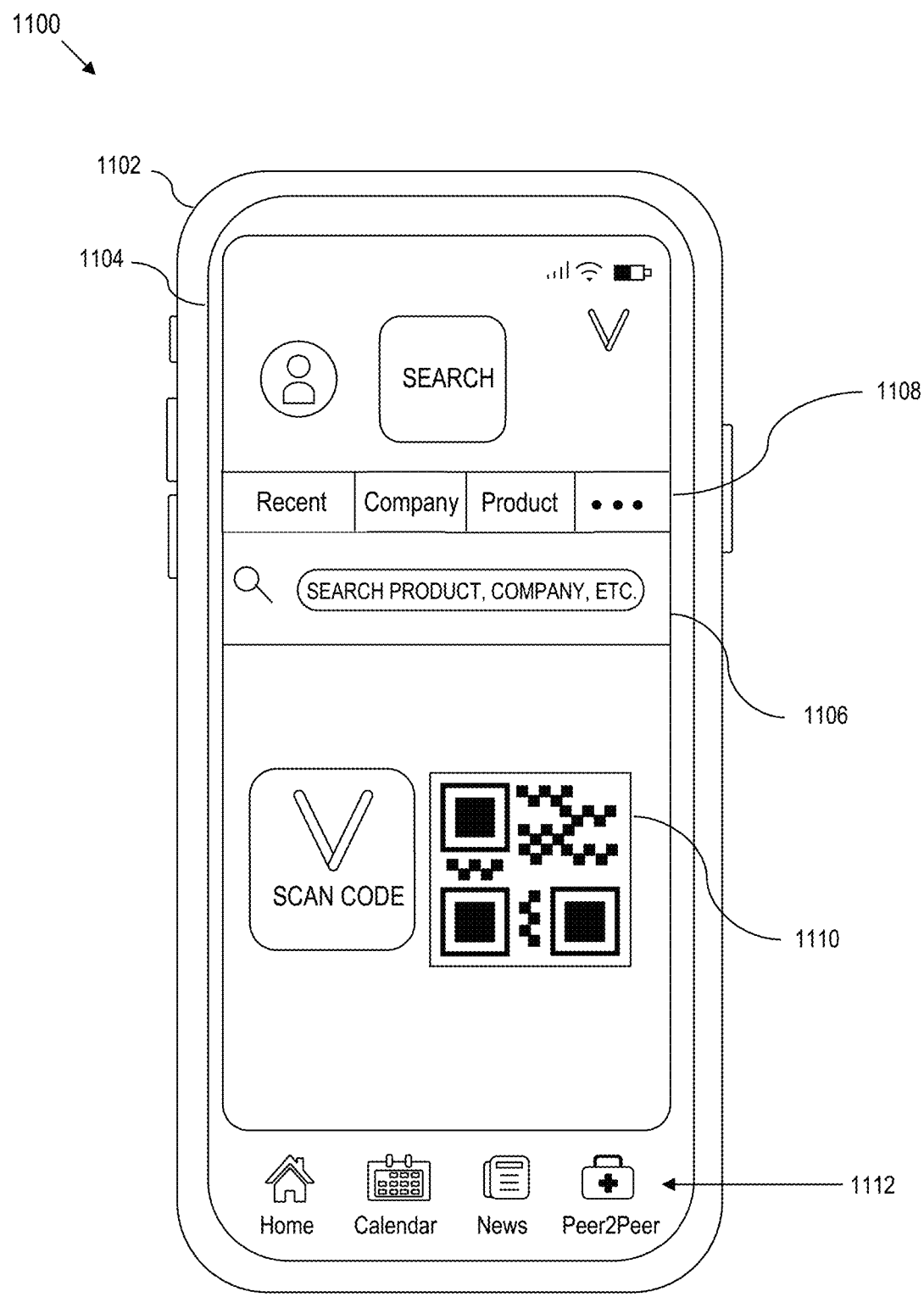
FIG. 11 is an example illustration of a graphical user interface of an app on a smartphone illustrating the ability to scan a code from within the app to interact with the communication platform of FIG. 1.

As illustrated in FIG. 11, a user is operating a smartphone 1102. The smartphone 1102 is running an app 1104 that is associated with the communication platform (see communication platform 114, FIG. 1). The app 1104, in this view, illustrates a graphical user interface that facilitates numerous functions, including a search function 1106 to search for resources available on the communication platform. The app 1104 also illustrates a set of functions 1108, including "Recent", "Company", and "Product", which allow the user to search on the communication platform based upon specific criteria captured by the function heading.

The app 1104 also provides a mechanism 1110 to engage electronic content in a machine-guided, and automated manner. For instance, the illustrated example enables the app to scan a barcode, QR code, tag, or other scannable or otherwise electronically detectable resource. The app 1104 may also include docked functions 1112, such as an ability to return to a "Home" screen within the app, pull up a calendar, open a newsfeed, access peer content, etc.

In the example implementation, a user detects a code, e.g., using the smartphone 1102. Here, the barcode can be on a pack, product, product packaging, company logo, physical document or physical media, provided in an image, provided in an electronic form, e.g., included in an electronic news article, provided on a sell-sheet, advertisement, informational publication, etc. In practical applications, detecting a code can comprise scanning a bar code, scanning a QR code, or by utilizing a scannable or electronically detectable form. In some embodiments, the app accesses a camera or other scanning technology on the smartphone. In other embodiments, an image is loaded that contains the code.

In other embodiments, such as where a clinician encounters a QR code on a product or advertisement, the clinician can use the smartphone camera to scan the QR code. Scanning the QR code can be used to automatically launch the app as illustrated in FIG. 11. If the clinician does not have the app, the QR code can cause the user to be directed to an app store to download and install the app. Once the user downloads and installs the app, the user can create an account and utilize the features described more fully herein.

Figure 12:
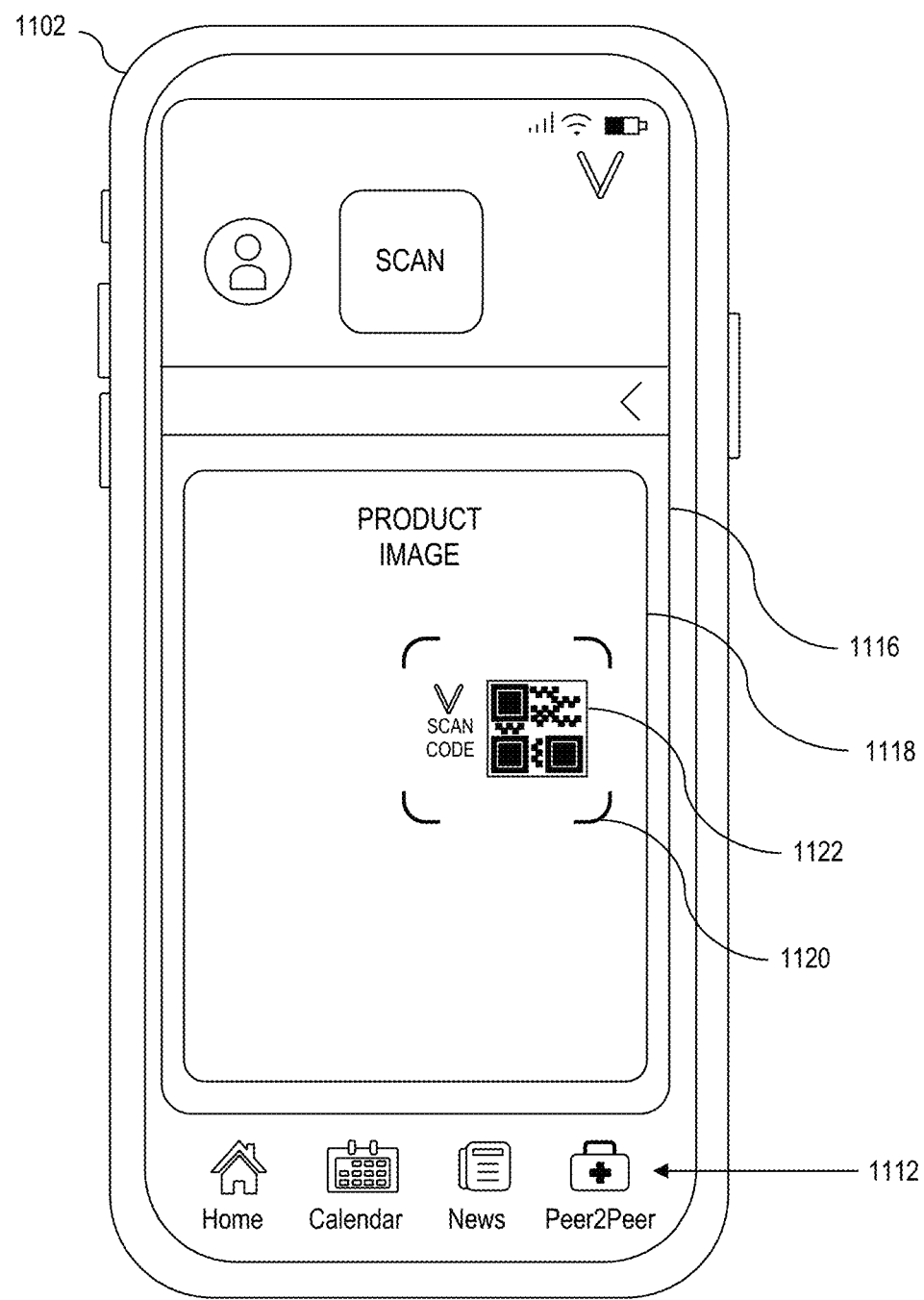
FIG. 12 is an example of the app of FIG. 11, illustrating the activation of a camera or otherwise accessing an image to scan a code of a product in proximity to the smartphone.

Referring to FIG. 12, the smartphone 1102 of FIG. 11 is illustrated. In this example embodiment, the docked function 1112 persists from the view of FIG. 11. However, the graphical user interface of the app provides on the screen of the smartphone, a work area 1116. Within the work area 1116, an image 1118, e.g., of a product, package, article, item or other detectable source is visually presented, with a capture window 1120 that locates a code, e.g., QR code 1122 on the source.

Figure 13:
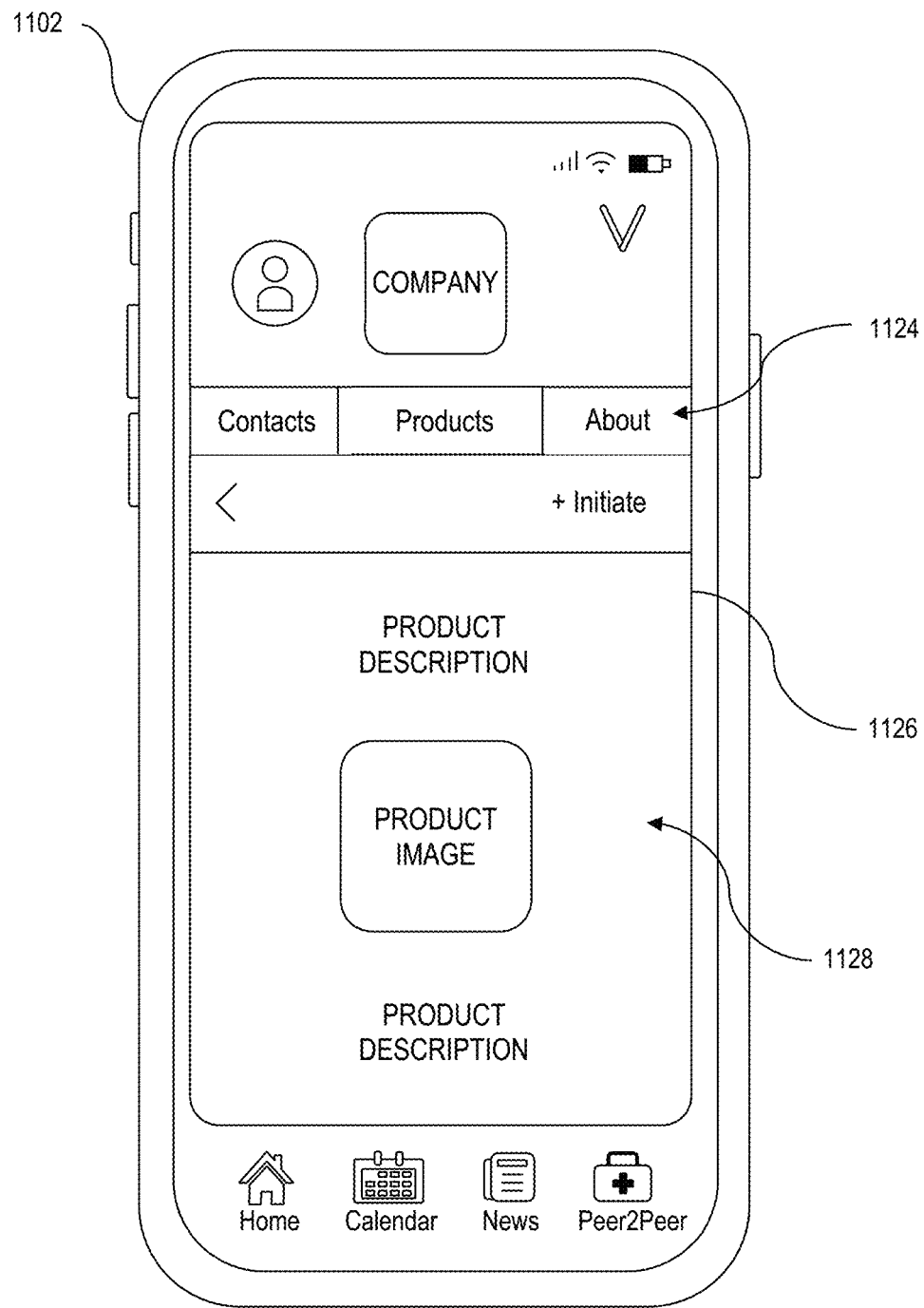
FIG. 13 is an example of the app of FIG. 11 illustrating the retrieval of information responsive to the user scanning the barcode as illustrated in FIG. 12.

Referring to FIG. 13, upon scanning the code, the app interacts with the communication platform (114, FIG. 1) to retrieve information associated with the scanned code. For instance, as illustrated, the app on the smartphone 1102 adds a set of menu items 1124 to access "Contacts", Products", or "About". A user selecting Contacts causes the app to load one or more contacts that can be accessed via direct communication as described and illustrated with regard to FIG. 14.

A user selecting the Products menu item causes the app to output to a display area of the app, additional product information. For instance, the app outputs to a display area 1126, an output 1128 comprised of text, graphics, hyperlinks, video, audio, image files, etc. to convey information associated with the scanned code.

Figure 14:
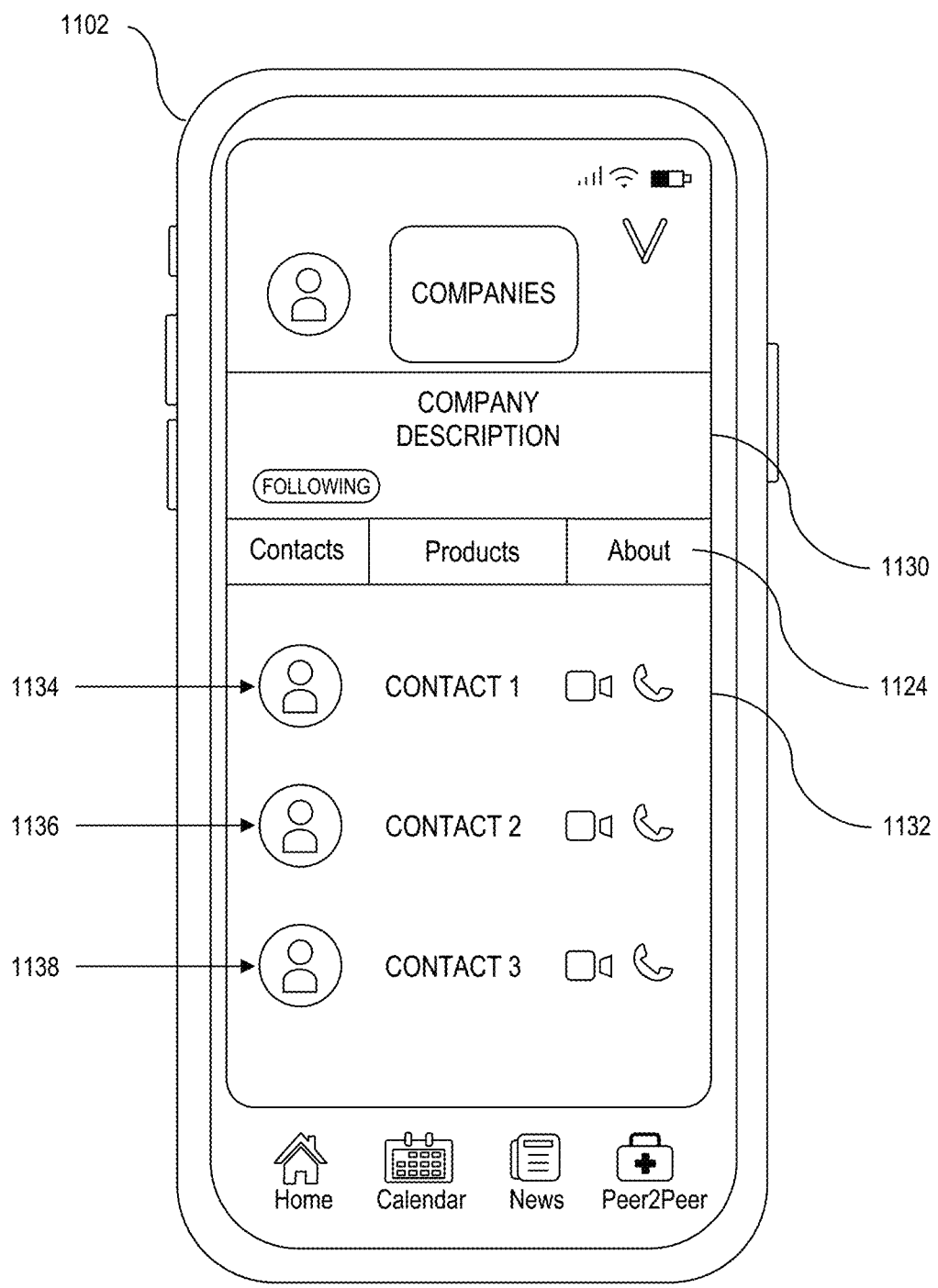
FIG. 14 an example of the app of FIG. 11 illustrating the user contacting a representative directly from within the app responsive to scanning a code associated with a company.

Referring to FIG. 14, a user interface illustrates an example where the user selects the Contacts menu item from the menu items 1124. In this example, the app on the smartphone displays a company description 1130 and provides a contacts window 1132. Within the contacts window 1132 is a list of one or more contacts, e.g., representatives, sales representatives, technical support representatives, etc. The contacts can be associated with the user based upon any of the techniques or combinations thereof set out herein. For instance, three example contacts are listed, including a first contact 1134, a second contact 1136 and a third contact 1138. For each listed contact, the contacts window 1132 can include a feature that initiates or otherwise enables a direct contact with the associated contact, e.g., by pressing an icon to automate a telephone call, to trigger a video call, to send a text message, etc.

Notably, in some embodiments, the contact information is maintained by the system, e.g., locally on the app, on the communication platform (114, FIG. 1), or a combination thereof. Because the contacts and contact communication information is stored by the communication platform, the user, e.g., clinician, need not remember the contact or the contact information because the communication platform manages these details.

In general, the code can link to any information defined by the host entity. For instance, the entity may associate the scannable code with a company product, company literature, product literature, a newsfeed story, or any other information can be presented responsive to scanning the code. In some embodiments, the scanned code links the user directly to a user contact as described more fully here, e.g., by loading a directory, by initiating direct communication (via phone, video, text, etc.) using techniques described more fully herein, e.g., as noted in the description with regard to FIG. 3A, FIG. 3B, or otherwise throughout this disclosure.

Miscellaneous

According to aspects of the present disclosure, approaches are provided that facilitate a connection between a user and a matched contact across a communication platform. In an example embodiment, the user operates a processing device having a graphical user interface (e.g., smartphone, tablet, laptop, desktop computer, etc.). An app, software program, web browser URL, or other code causes the processing device to display on a display screen, a user interface element, e.g., a graphical representation of a icon such as a button, or other feature. Here, the user interface element defines a trigger. The connection between the user and the matched contact is facilitated responsive to the user selecting the user interface element (e.g., selecting, pressing, clicking on, or otherwise navigating to and selecting a "contact" button). By way of example, a digital "contact" button can reside in a story, article, or other electronic content provided in the app, e.g., as part of a newsfeed provided by the communication platform and function as a trigger to enable the direct connection between the user and the matched contact. In other examples, the user interface element can be provided in some content available on the communication platform (in addition to or in lieu of a newsfeed), which is available to the user. In this example, the user selects the button, which triggers the app to enable a direct communication between the user and the matched contact. Here, the matched contact can be a contact associated with the content.

In another example embodiment, a detectable code (e.g., a barcode or QR code) is provided on an article, e.g., product, product package, label, sell sheet, flyer, or other physical media, an advertisement, or other printed or on-line materials. Here, the user's processing device can utilize a camera to scan the code, which launches the app and triggers the app to enable a direct communication between the user and the matched contact. Thus, the QR code in this example, is external to the app. Here, the matched contact can be a contact associated with the scanned code. In another embodiment, the app can include a code scanner function. Thus, the user can open the app, select the scanner and use a camera or other device to scan a QR code on a physical media. Analogous to that above, scanning the QR code triggers the app to enable a direct communication between the user and the matched contact, who may be associated with the QR code.

Regardless, whether by scanning a QR code outside the app or by the user selecting a "contact" button within the app, the result can be the same. The user is directed to their matched contact(s) within an associated entity (matched connection(s) within a company) that is associated with the trigger (QR code, "connect" button, etc.)

Regardless of the trigger, in some embodiments, the direct communication can include a telephone call, a video call, a text message, or combination thereof, where the communication is handled through the communication platform so that personal contact information of the user (e.g., the user's phone number, email address, etc.) is not revealed in the direct communication to the matched contact.

As noted more fully herein, a 2-sided database can be utilized by the communication platform that matches, e.g., through matching attributes. The database matches pairs, e.g., the user to a matched contact associated with an entity (e.g., a contact within a company). Users may not know their appropriate contacts and/or their contacts' connection information in an associated company. Moreover, users may not want to share their personal contact info (phone/email) with their contacts. Having a matching system allows the user to always be able to access the appropriate contacts and to be able to contact them directly without sharing personal contact information.

Processing Device

As will be appreciated by one skilled in the art, aspects of the present invention may be embodied as a system, method or computer program product. Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium includes, for example, but not limited to, a hard disk, solid state drive, a random-access memory (RAM), a read-only memory (ROM), an erasable programmable read-only memory (EPROM), Flash memory, an optical storage device (e.g., CD-ROM), a magnetic storage device, or any suitable combination of the foregoing or other storage hardware. Thus, a computer readable storage medium includes any tangible medium that can contain or store a program for use by or in connection with an instruction execution system, apparatus, or device.

A computer readable signal medium is a propagated data signal with computer readable program code embodied therein, for example, in baseband or as part of a carrier wave. A computer readable signal medium may be any computer readable medium that is not a computer readable storage medium.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, such that the instructions, which execute via the processor, create means for implementing the functions/acts specified in the flowchart and/or block diagram block or blocks.

The computer program instructions may also cause a series of operational steps to be performed to produce a computer implemented process such that the instructions which execute on the computer implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A process for interacting on a communication platform, comprising:
    storing in a data source associated with the communication platform, a user profile of a user registered to utilize the communication platform;
    filtering content for the user from a collection of content available to the user based upon at least one of:
        data in the user profile; and
        data associated with the content;
    communicating the filtered content to a display of a processing device for viewing by the user;
    opening a user-selected item of content for viewing on the display of the processing device; and
    displaying a user-selectable contact icon on the display of the processing device;
    wherein, upon selection of the contact icon by the user:
        facilitating by the communication platform, a direct communication with a specific contact of a content provider associated with the user-selected item of content, where the specific contact is associated with the user by a relationship on the communication platform; and the direct communication is independent of the content itself.

2. The process of claim 1 further comprising:
limiting the filtered content to items of content associated with content providers for which the user has a relationship or for which the user can form a relationship based upon rules defined by the communication platform that associate the user with a corresponding group.

3. The process of claim 1 further comprising:
facilitating by the communication platform, upon selection of the contact icon by the user, the direct communication by:
outputting a graphical representation of a directory associated with the content provider onto the display of the processing device where the directory displays contacts of the content provider; and
receiving a selection from the user of the specific contact from the directory.

4. The process of claim 3 further comprising:
implementing the directory utilizing a two-sided database that filters contacts associated with the content provider that have or can form a relationship with the user on the communication platform based upon at least one rule implemented by the communication platform.

5. The process of claim 1, wherein upon selection of the contact icon by the user, the communication platform facilitates the direct communication with the specific contact of the content provider by:
facilitating a select one of:
a telephone call between a telephone of the user and a telephone associated with the specific contact through the communication platform;
a video call between a video device of the user and a video device associated with the specific contact through the communication platform; and
an electronic text communication between a text communication device of the user and a text communication device associated with the specific contact through the communication platform;
wherein direct communication between the user and the contact is carried out through the communication platform without revealing to the contact, any personal contact information of the user, by using the platform as an intermediate of the communication.

6. The process of claim 1 further comprising:
displaying a user-selectable connect link on the display of the processing device at least while the user-selected content item is displayed;
wherein:
upon the user selecting the connect link, creating by the communication platform, a data link between the user and the content provider.

7. The process of claim 1 further comprising:
displaying, upon detecting that the user does not have a relationship with the associated content provider on the communication platform, a user-selectable connect link on the display of the processing device at least while the user-selected content item is displayed;
wherein:
upon the user selecting the connect link, creating by the communication platform, a data link between the user and the content provider.

8. The process of claim 1 further comprising:
storing in the user profile, at least one of a role of the user, a group to which the user is associated, and a location of the user; and
storing associated with each content item, a content item profile that includes data utilized by the communication platform to determine an intended audience on the communication platform, the data including at least one of a role to which the content item pertains, a group to which the content item pertains, and an area of coverage;
wherein filtering content for the user comprises matching the content item to the user where at least one of:
the role to which the content item pertains matches the role of the user;
the group associated with the user matches the group to which the content item pertains; or
the site of care of coverage of the content item matches the site of care of the user.

9. The process of claim 1, wherein the content comprises content items selected from:
product information, news articles, promotional banners, educational content, company lists, or a combination thereof.

10. The process of claim 1 wherein:
filtering content for the user comprises curating a newsfeed for the user from a collection of aggregated articles, each article corresponding to a content item selected for the user based upon at least one of:
data in the user profile; and
data associated with the article;
communicating the filtered content comprises communicating the curated newsfeed to the display of the processing device for viewing by the user;
opening the user-selected item of content comprises opening a user-selected article of the curated newsfeed for viewing on the display of the processing device; and
facilitating by the communication platform, the direct communication comprises facilitating by the communication platform, the direct communication with the specific contact of the content provider associated with the user-selected article.

11. The process of claim 10 further comprising:
limiting the curated newsfeed articles to content providers for which the user has a relationship or for which the user can form a relationship based upon rules defined by the communication platform.

12. The process of claim 10 further comprising:
storing in the user profile, an identification of the user as a clinician, an area of practice of the user, and a location of practice of the user, at least one of which provides data to the communication platform to curate the newsfeed for the user; and
storing in the user profile an identification of companies and/or sales contacts of companies, with whom the user has established a relationship on the communication platform.

13. The process of claim 12 further comprising:
storing in the user profile, at least one of an area of practice of the user, and a location of practice of the user; and
storing associated with each article, an article profile that includes data utilized by the communication platform to determine an intended audience on the communication platform, the data including at least one of an area of practice to which the article pertains, and locations of coverage;

wherein curating the newsfeed for the user on the communication platform comprises matching the article to the user where at least one of:
  the area of practice in the article profile matches the area of practice of the user; or
  the location of coverage in the article profile matches the location of practice of the user.

14. The process of claim 10 further comprising:
storing associated with each article, an article profile that includes data utilized by the communication platform to determine an intended audience on the communication platform, the data including at least one area of practice associated with the corresponding article, a territory associated with the corresponding content provider, and an aging attribute such that older articles age out of the news feed for the user.

15. The process of claim 10 further comprising:
hosting on the communication platform, a business unit administrator dashboard, the business unit administrator dashboard available only to those users of the communication platform having a business unit administrator role in their associated user profile; and
providing a selection within the business unit administrator dashboard to launch program code to create a new article, the program code prompting the business administrator to enter a headline, an article body, areas of practice, and a broadcast scope.

16. The process of claim 10 further comprising:
displaying on the processing device, the curated news feed as snippets, where one snippet is associated with each curated article; and
opening the article for full viewing responsive to a user selecting the snippet;
wherein:
  at least one visual element is different for the displayed article depending upon whether the user is connected to the content provider, or whether the user is not connected to the content provider.

17. A process for creating a dynamic communication link on a communication platform, comprising:
storing in a database associated with a communication platform, a clinician profile of a clinician registered to utilize the communication platform;
aggregating articles from content providers on the communication platform, the articles relating to information of interest to clinicians, each article having an article profile that defines an intended audience of users on the communication platform;
curating a newsfeed for the clinician by assembling select ones of the aggregated articles, each article selected for the clinician based upon matching data in the clinician profile and data in the article profile, the curated newsfeed articles limited to content providers for which the clinician has a relationship or for which the clinician can form a relationship based upon rules defined by the communication platform;
sending the curated newsfeed to a display of a processing device for viewing by the clinician;
opening a clinician-selected article of the curated newsfeed for viewing on the display of the processing device; and
providing a user-selectable contact icon on the display of the processing device at least while the clinician-selected article is displayed, wherein, upon selection of the contact icon by the clinician, the communication platform facilitates a direct communication with a specific contact of the content provider that is uniquely associated with the clinician by a relationship on the communication platform, where the direct communication is independent of the newsfeed.

18. The process of claim 17 further comprising:
initiating by the communication platform, upon selection of the contact icon by the clinician, a direct communication with the specific contact of the content provider by launching a graphical representation of a directory onto the processing device, the directory individuals associated with the content provider that have or can form a relationship with the clinician on the platform.

19. The process of claim 17 further comprising:
initiating, upon selection of the contact link by the clinician, the direct communication with the specific contact of the content provider by:
utilizing data in the clinician profile to identify the specific contact of the content provider that is associated with the clinician; and
automatically triggering a select one of:
  a telephone call between a telephone of the clinician and a telephone associated with the specific contact;
  a video call between a video device of the clinician and a video device associated with the specific contact; and
  an electronic text communication between a text communication device of the clinician and a text communication device associated with the specific contact;
wherein direct communication between the user and the contact is carried out through the communication platform without revealing to the contact, any personal contact information of the user, by using the platform as an intermediate of the communication.

20. The process of claim 17 further comprising:
displaying a user-selectable connect link on the display of the processing device at least while the user-selected article is displayed upon detecting that the clinician does not have a relationship with the associated content provider on the communication platform, wherein the connection link enables the clinician to connect with the associated content provider of the article.

* * * * *